(12) United States Patent
Borremans et al.

(10) Patent No.: US 12,484,836 B2
(45) Date of Patent: Dec. 2, 2025

(54) OPTICAL RESPONSE MEASUREMENT FROM SKIN AND TISSUE USING SPECTROSCOPY

(71) Applicant: SPECTRICITY, Mechelen (BE)

(72) Inventors: Jonathan Borremans, Lier (BE); Prashant Agrawal, Leuven (BE)

(73) Assignee: Spectricity, Mechelen (BE)

( * ) Notice: Subject to any disclaimer, the term of this patent is extended or adjusted under 35 U.S.C. 154(b) by 998 days.

(21) Appl. No.: 16/959,631

(22) PCT Filed: Jan. 22, 2019

(86) PCT No.: PCT/EP2019/051494
§ 371 (c)(1),
(2) Date: Jul. 1, 2020

(87) PCT Pub. No.: WO2019/141869
PCT Pub. Date: Jul. 25, 2019

(65) Prior Publication Data
US 2020/0383628 A1  Dec. 10, 2020

(30) Foreign Application Priority Data
Jan. 22, 2018 (EP) .................................. 18152787

(51) Int. Cl.
*A61B 5/00* (2006.01)
(52) U.S. Cl.
CPC .............. *A61B 5/44* (2013.01); *A61B 5/0002* (2013.01); *A61B 5/0075* (2013.01); *A61B 5/681* (2013.01);
(Continued)

(58) Field of Classification Search
CPC ....... A61B 5/44; A61B 5/0002; A61B 5/0075; A61B 5/681; A61B 5/7475
See application file for complete search history.

(56) References Cited

U.S. PATENT DOCUMENTS 10,194,808 B1 * 2/2019 Thompson ............. A61B 5/681
2002/0161290 A1 10/2002 Chance
(Continued)

FOREIGN PATENT DOCUMENTS

CN 102058393 A 5/2011
CN 102438511 A 5/2012
(Continued)

OTHER PUBLICATIONS

International Searching Authority; International Search Report and Written Opinion; Int'l Application No. PCT/EP2019/051494; Apr. 8, 2019; 9 pgs.
(Continued)

*Primary Examiner* — Patricia J Park
(74) *Attorney, Agent, or Firm* — Katz Ruby & Carle LLP; Kelly H. Hale

(57) ABSTRACT

A device for measuring optical response from skin includes one or more illumination sources configured to irradiate light directly onto skin or tissue, where each illumination source is configured to provide light within a predetermined range of optical wavelengths. The device further includes one or more spectrometers, each including a plurality of interference filters overlaying one or more optical sensors, where each of spectrometers has a sensing range within a predetermined range of optical wavelengths and is configured to capture light emitted from the skin or tissue. Each of the one or more spectrometers included of the device is positioned a predetermined distance from at least one illumination source of the one or more illumination sources.

20 Claims, 13 Drawing Sheets

(52) U.S. Cl.
CPC .... *A61B 5/7475* (2013.01); *A61B 2560/0214* (2013.01); *A61B 2562/164* (2013.01); *A61B 2562/185* (2013.01); *A61B 2562/222* (2013.01)

(56) References Cited

U.S. PATENT DOCUMENTS

| | | | |
|---|---|---|---|
| 2005/0033127 A1* | 2/2005 | Ciurczak | A61B 5/1455 |
| | | | 600/316 |
| 2009/0163775 A1 | 6/2009 | Barrett et al. | |
| 2010/0168586 A1* | 7/2010 | Hillman | G01J 3/457 |
| | | | 348/E13.001 |
| 2010/0252721 A1* | 10/2010 | Xu | A61B 5/14532 |
| | | | 362/296.05 |
| 2014/0171759 A1* | 6/2014 | White | A61B 5/6835 |
| | | | 600/306 |
| 2016/0113503 A1 | 4/2016 | Benaron | |
| 2016/0242682 A1* | 8/2016 | Gulati | G01J 3/42 |
| 2018/0184972 A1* | 7/2018 | Carmi | A61B 5/4872 |
| 2019/0049300 A1* | 2/2019 | Gu | G01J 3/44 |

FOREIGN PATENT DOCUMENTS

| | | |
|---|---|---|
| EP | 0689398 B1 | 10/2003 |
| JP | 11244266 A | 9/1999 |

OTHER PUBLICATIONS

China National Intellectual Property Office; First Office Action; Application No. 2019800092381; Dec. 26, 2022; 8 pgs.

\* cited by examiner

OPTICAL RESPONSE MEASUREMENT FROM SKIN AND TISSUE USING SPECTROSCOPY

CROSS-REFERENCE TO RELATED PATENTS

The present U.S. Utility Patent Application claims priority pursuant to U.S.C. § 371 as a U.S. National Phase Application of International Application No. PCT/EP2019/051494, entitled "Optical Response Measurement From Skin And Tissue Using Spectroscopy", filed Jan. 22, 2019, which claims priority to EP Application No. 18152787.0, entitled "A Wearable Device For And Methods Related To The Measurement Of The Optical Response Of Skin And Underlying Tissue", filed Jan. 22, 2018, abandoned, both of which are hereby incorporated herein by reference in their entirety and made part of the present U.S. Utility Patent Application for all purposes.

BACKGROUND OF THE INVENTION

Technical Field of the Invention

This invention relates generally to spectroscopy and more particularly to measuring physiological parameters in skin and tissue using optical spectroscopy.

Description of Related Art

Spectroscopy involves the measurement of spectra produced when matter interacts with or emits electromagnetic radiation. Transmittance of diffuse optical reflectance spectroscopy of tissue involves illuminating the tissue using an illumination source and using a detector to capture light from the tissue being illuminated. In the case of diffuse optical reflectance spectroscopy, reflected light from the tissue is captured at the detector, whereas transmittance spectroscopy involves the capture of light transmitted through the tissue at the detector.

An illuminating light source penetrates skin and underlying tissue based on the components of the light source and the properties of the skin and tissue and is captured by a detector as a combination of reflected, scattered and transmitted light that can reveal attributes of the skin, underlying tissue, blood vessels and more. Illumination sources and/or detectors can be implanted under skin, made to contact the skin or placed in close proximity to the skin. For example, a small, integrated detector can be placed in known proximity to an illumination source. In another example, a small integrated detector and illumination source can be incorporated into a wearable device, such as a patch, bracelet or wristwatch. In yet another example a small integrated detector and illumination source can be incorporated into an implanted medical device, such as a pacemaker, or in-situ glucose tester.

SUMMARY

Measuring different physiological parameters in skin and tissue typically requires several devices based on different technologies. For example, heart rate can be measured optically or using ECG, blood oxygenation is measured optically, blood pressure is measured using cuff-based pressure sensing, hydration and body fat are measured using bio-impedance analysis, or urine strips. Wearable devices for health, available today, fall into several categories, amongst for example optical measurement based, and electrical impedance measurement based. This first category of wearables typically use 1 to 8 discrete wavelengths for measuring parameters like pulse rate, pulse rate variability, oxygenation, etc. A second category of wearables typically use a few electrical contact points for impedance measurement for EKG, hydration, body fat, etc. measurement. These wearables are being used both in clinical and non-clinical context and can be found in several form factors such as smart watches, bracelets, patches, clip-ons.

Diffuse optical reflectance or transmittance spectroscopy of skin tissue consists of illuminating skin with a light source and using a suitable detector to capture light, reflected light in case of reflectance spectroscopy, transmitted light in case of transmittance spectroscopy, or a combination thereof. The light incident on the skin surface penetrates the skin, optionally penetrates in the tissue underneath the skin, and then scatters depending on skin and/or tissue properties. The extent of penetration depends on the wavelength components in the light source and on the skin properties. Thus, the light captured by the detector is a mix of light which has been reflected, scattered and transmitted by the illuminated skin, underlying tissue and their components such as layers, tissues, blood vessels, etc. These components can be part of the tissue or can be artificial components implanted under the skin, such as bio sensing fibres which alter their optical properties or response in the presence of other substances inside the tissue. This interaction of light with different components under and within the skin is affected by their physiological status. For example, light interacts differently with oxygenated and deoxygenated hemoglobin in blood vessels. This difference can be used to measure the blood oxygenation level, a principle commonly used in oximetry.

Optical measurements for extracting body parameters allow non-invasive solutions to be developed. A few examples are measurable body parameters (either directly or indirectly) are oxygen saturation in blood and tissue, lactate in muscles, blood gases such as O2 and CO, tissue hydration level, body fatness percentage, heart rate, blood pressure, etc. Measuring these parameters is relevant for clinical procedures and monitoring, general health and condition monitoring, collection of data for research and development purposes, e.g. clinical trials for drug development, studies involving large populations. It is relevant, not only in case of humans but also animals, such as, pets e.g. dogs, and cattle, e.g. cows. The currently used optical technology-based devices have a few limitations:

Existing optical measurement solutions can be limited to measuring only a few parameters, such as heart rate and blood oxygenation, and accuracy may not considered to be of clinical grade, because the methods used to extract the features, for example, using 2 wavelengths to extract SpO2, are prone to influences of other elements in the sample measured, for example methemoglobin. (See, for example, FIG. 7 below) Moreover, they do not provide flexibility and are not future-proof. Components must be selected for specific optical responses, which are specific to the parameters to be measured and these devices cannot support new parameters or new measurement principles of existing parameters.

Diffuse optical spectroscopy of the skin is possible by means of lab equipment available in different form factors from handheld to benchtop. It requires trained personnel for it use. As a result of it, the diagnosis or monitoring can only be carried out in specific environment such as hospitals or clinics where trained personnel operate it. This in turn limits the scope, frequency and duration for which one or more vital parameters can be measured. It has been well established through research that several body parameters such as hydration, oxygenation and total hemoglobin can vary over time, and it may be important to frequently or continuously monitor these parameters for clinical as well as non-clinical purposes. With the currently available devices, such diagnostics become very expensive and are restricted to hospital or healthcare environments as the equipment are expensive, not mobile and intended for professional use only.

At least partly because of non-availability of miniaturized spectrometers, diffuse optical spectroscopy of the skin tissue has generally been based on a laboratory test, which are typically performed in hospital environments using desktop equipment with probe systems to probe the body. The inventors are not aware of solutions where optical spectroscopy has been integrated in wearables, especially in patches, because of non-availability of miniaturized spectrometers. Accordingly, there is a need for a non-invasive measurement of at least one physiological skin parameter using at least one miniaturized optical spectrometer in contact with the skin to allow diffuse optical spectroscopy. Measurements obtained in this manner can used, for example, for condition monitoring, health monitoring, collection of data for research and clinical trials, etc.

A light weight, portable, non-invasive and non-intrusive spectroscopy device, comprising at least one optical spectrometer, preferably monolithically integrated, and at least one integrated light source, combined on an electronic substrate is disclosed below. The use of one or more spectrometers, each comprising a hyperspectral filter, monolithically integrated on a sensor, for sensing light coming from an area of interest and at least one light source for illuminating the area of interest, enables portable, light weight, non-intrusive and non-invasive devices. In some embodiments the device can be configured such that the spectrometer is shielded from environmental light, whereas the filter is preferably monolithically integrated on the sensor, the filter can be attached to the sensor.

An aspect of the invention discloses a wearable skin optical response measurement device, the device comprising an electronic substrate comprising an illumination source having a predetermined range of optical wavelengths and configured to, when being in contact with skin, irradiate light directly into the skin, and a spectrometer, having an interference filters on top of a light sensor, the spectrometer having a sensing range is matched the predetermined range of optical wavelengths and configured to, when being in contact with the skin, directly capture light emitted out of the skin, and whereby the spectrometer is positioned at a predetermined distance of the illumination source to capture the irradiated light when being emitted out of the skin at that predetermined distance.

According to embodiments the predetermined distance is selected to match the penetration path of the irradiated light having a predetermined wavelength.

According to embodiments the device comprises multiple illumination sources and/or multiple spectrometers whereby the sources and/or spectrometers are positioned on the electronic substrate relative to each-other to determine a spatial optical response of the skin upon irradiation.

According to embodiments the spectrometer is configured to provide a spectral discrimination of the captured light in at least 7 spectral bands.

According to embodiments the device further comprises an wideband illumination source to, when in use, measure the optical response of a skin parameter which depends on a wide spectral range, and one narrowband illumination source to, when in use, measure the optical response of a skin parameter which depends on a narrow spectral range, whereby the narrow spectral range is smaller than the wideband spectral range.

According to embodiments the device further comprises a control unit configured to switch the device between a continuous tracking mode to, when in use, activate the narrowband illumination source, and a sporadic tracking mode, to when in use, activate the wideband illumination source.

According to embodiments the device further comprises: a battery configured to power at least the illumination source and the spectrometer, a processor configured to process the outcome of the spectrometer, and a communication device configured to exchange information with the device.

According to embodiments the device further comprises a memory configured to store the outcome of the spectrometer and/or the outcome of the processor if present, a user interface configured to interact with the device, and a sensor configuration to measure a non-optical response of the skin.

Another aspect of the invention discloses a method for measuring the optical response of a skin using a device that comprises a first set of one or more illumination sources and one or more spectrometers at a predetermined distance from each-other, and the method comprises contacting the skin with the device, and measuring an optical response of skin using the first set.

According to embodiments the device further comprises a second set of illumination source and spectrometer at a predetermined distance from each-other, and the method further comprises measuring another optical response of the skin using the second set and modifying the second measurement using the first measurement.

According to embodiments the method can be set up such that the first measurement is used as a confidence image to assess whether an actual skin is measured, and once the first measurement has been accredited, optical response of the actual skin is analyzed.

According to embodiments the method can be set up such that two parameters are extracted from the first measurement, and one parameter is used as reference for the other parameter.

According to embodiments the method can be set up such that the first set is placed on a reference location on the skin and the second set is placed on a location of interest on the skin, and the first measurement is used as the reference for the second measurement.

According to embodiments the method can be set up such that the optical response is used to derive one or more physiological parameters using in-vivo spectroscopy on the skin.

According to embodiments the optical response is used to extract heart rate, heart rate variability, maximum rate of oxygen consumption ($VO_2$), blood oxygen saturation ($SpO_2$), blood CO saturation (SpCO), muscle oxygen saturation, tissue oxygenation, total hemoglobin index (THI), pulse rate (PR), pulse rate variability (PRV), tissue hydration, body fat percentage, blood pressure.

BRIEF DESCRIPTION OF THE SEVERAL VIEWS OF THE DRAWING(S)

Figure 7:
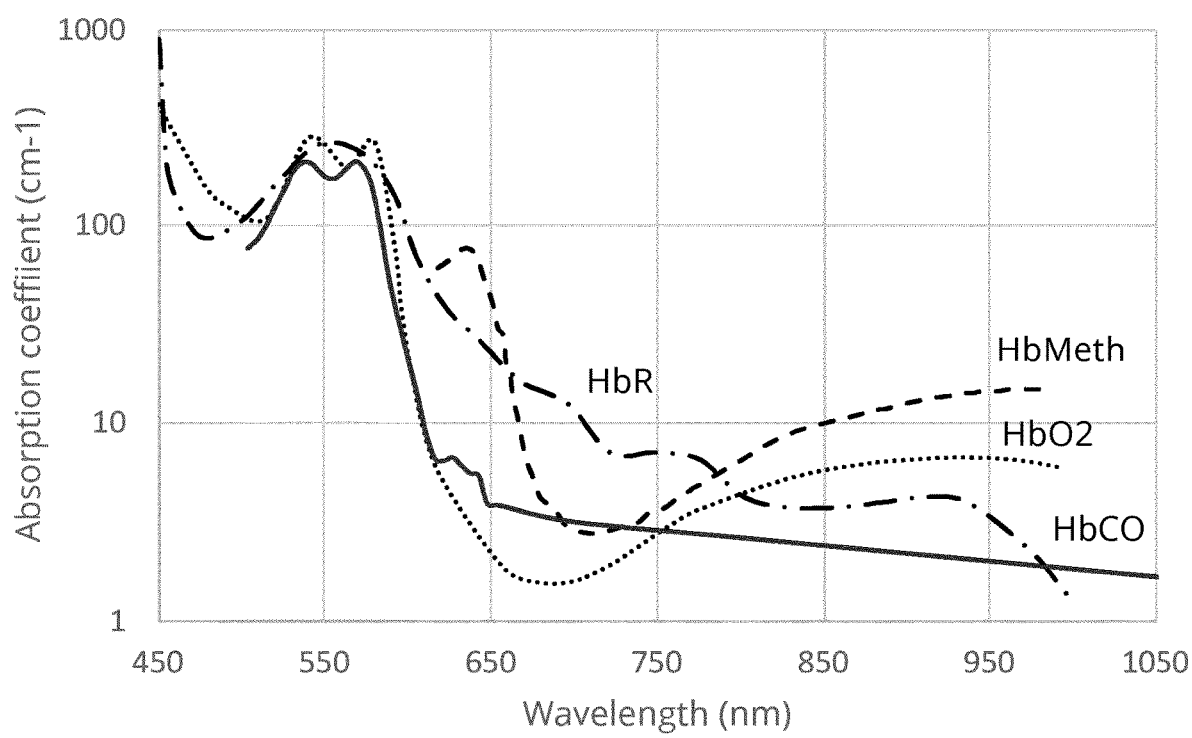
Figure 8:
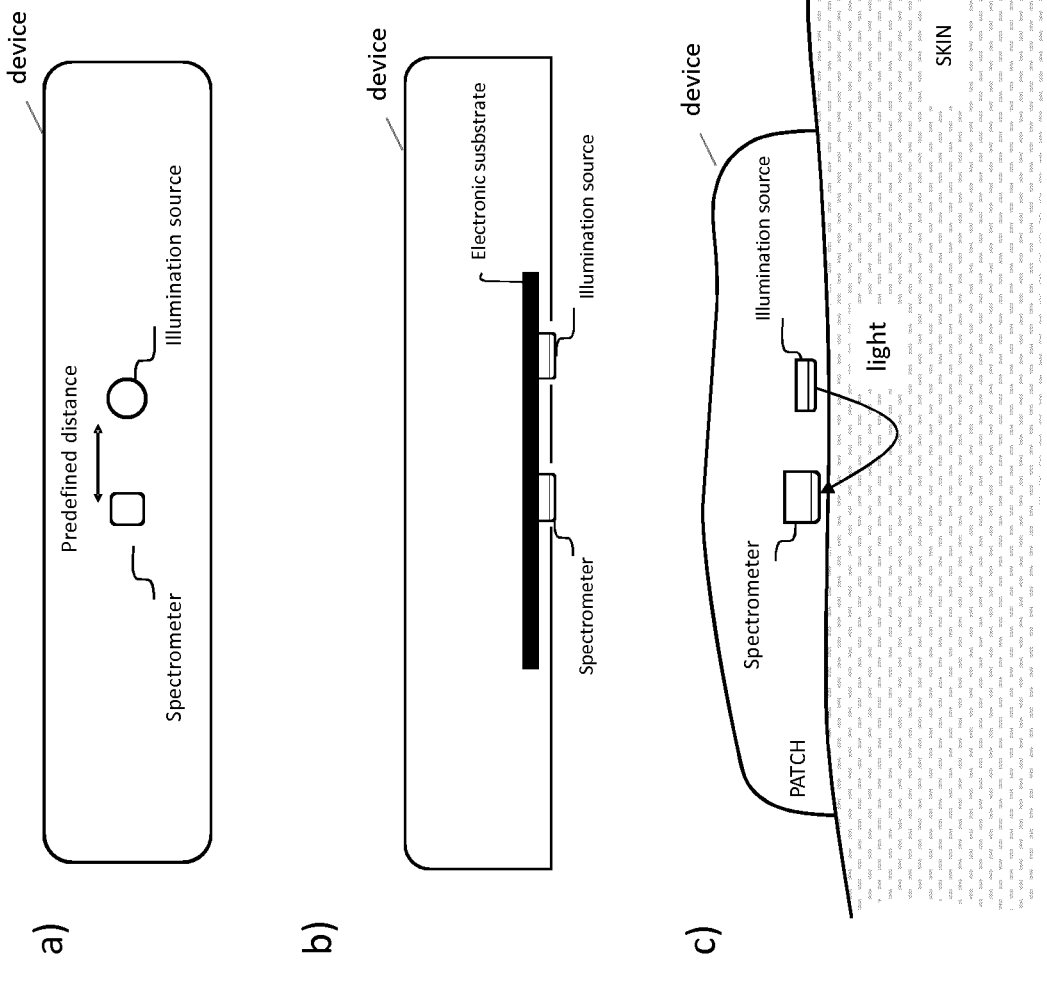
Figure 10:
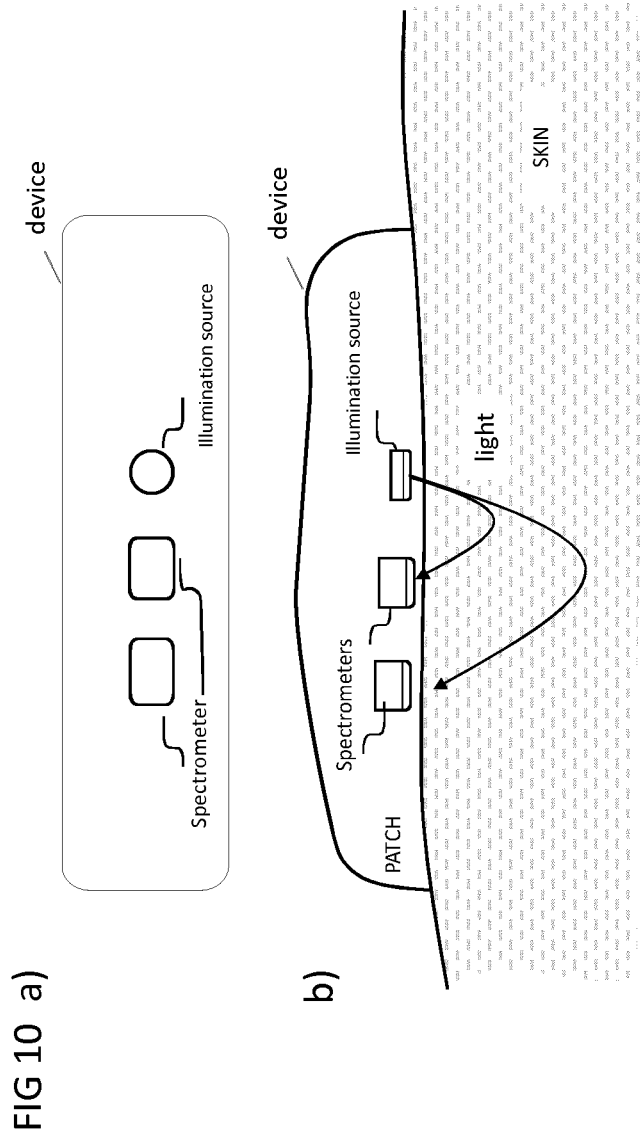
Figure 11:
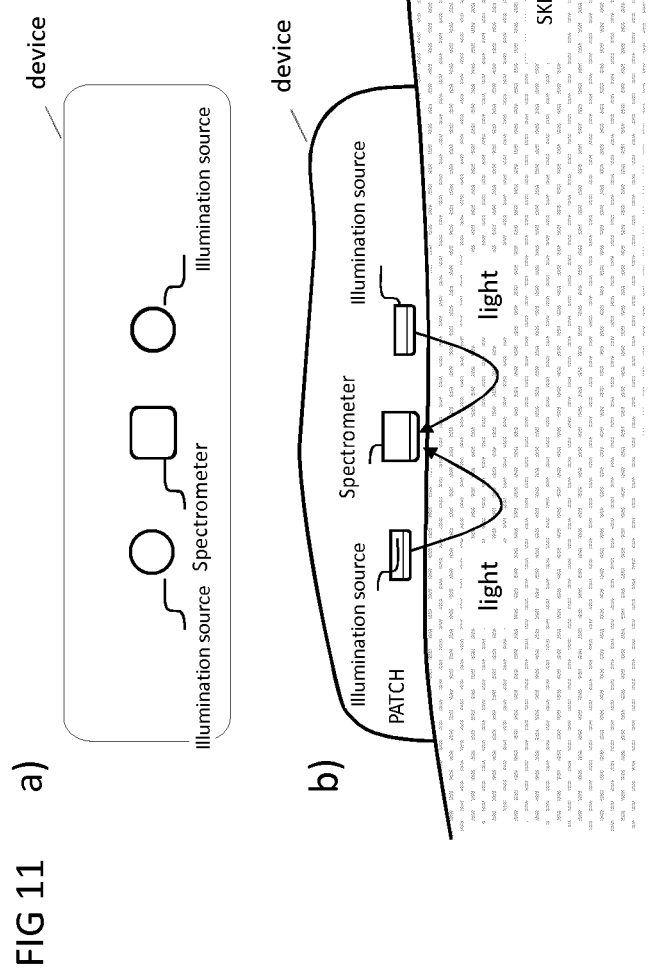
Figure 12:
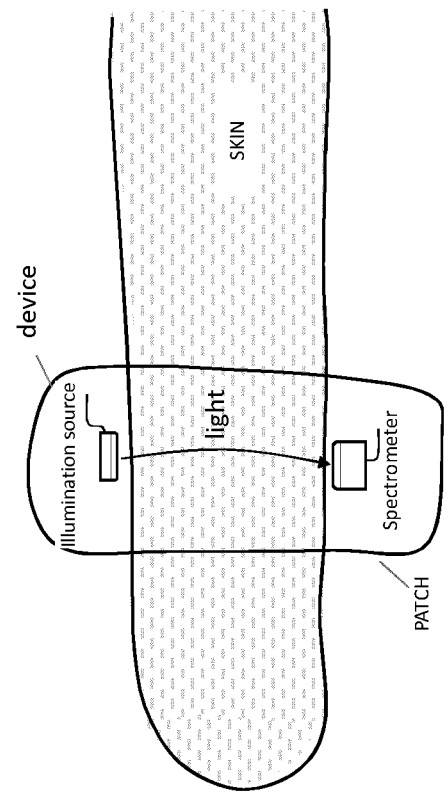
Figure 13:
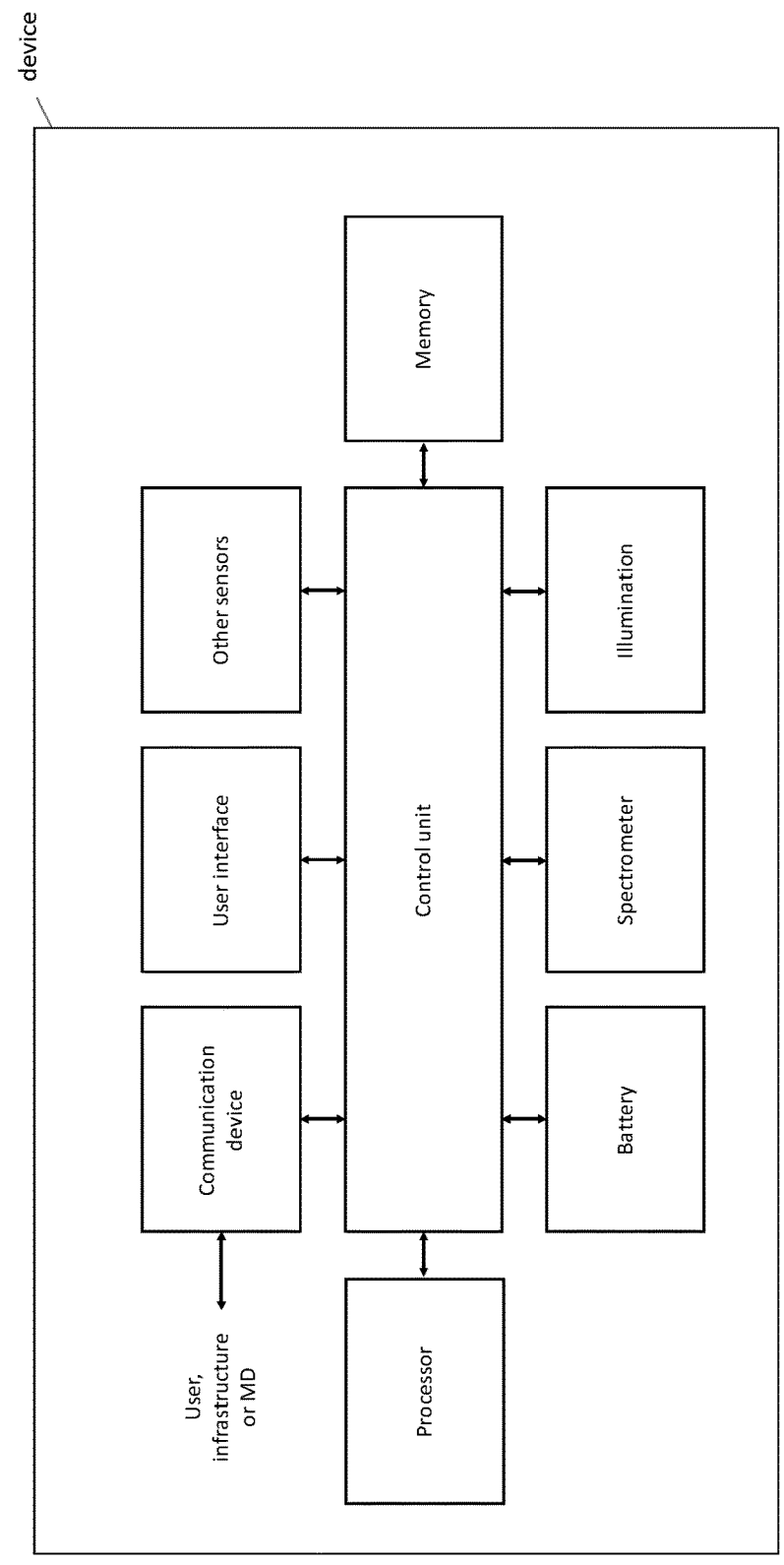

FIG. 7 provides a representative relationship between absorbance and light wavelength for reduced hemoglobin (HbR), oxyhemoglobin (HbO$_2$), methemoglobin (HbMeth), and carboxyhemoglobin (HbCO);

FIG. 8a-c describes an embodiment with a) schematic top view of the device, b) schematic cross-section, and b) an impression of the device when in contact with the skin;

FIG. 9a-d describes different embodiments where the devices contains more than 1 spectrometer and/or light source (illumination);

FIG. 10a-b describes an embodiment with a) schematic top view of the device, and b) an impression of the device when in contact with the skin;

FIG. 11a-b describes an embodiment with a) schematic top view of the device, and b) an impression of the device when in contact with the skin;

FIG. 12 describes an embodiment with an impression of the device in contact with skin whereby spectrometer and light source (illumination) are positioned for transmittance spectroscopy, and FIG. 13 describes a schematic building block of an device according to an embodiment;

DETAILED DESCRIPTION OF THE INVENTION

Figure 1A:
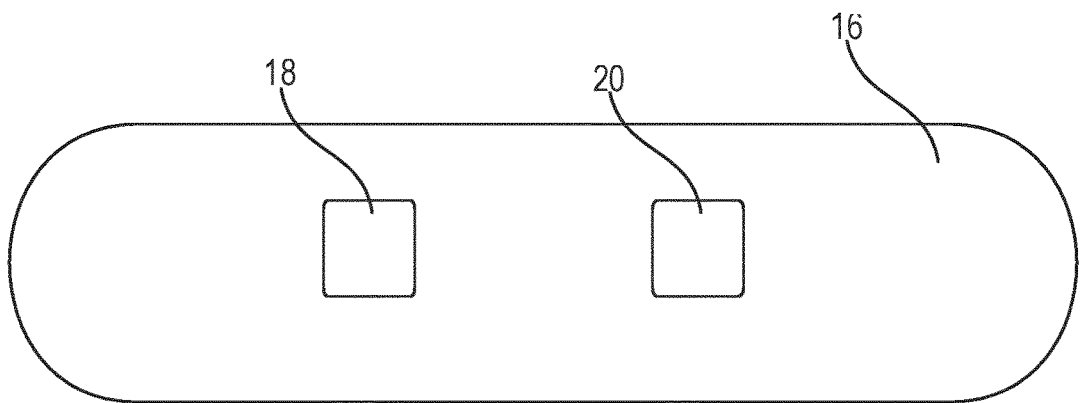
FIG. 1A is a top view of a block diagram of an embodiment of a spectroscopy device in accordance with the present invention.
Figure 1B:
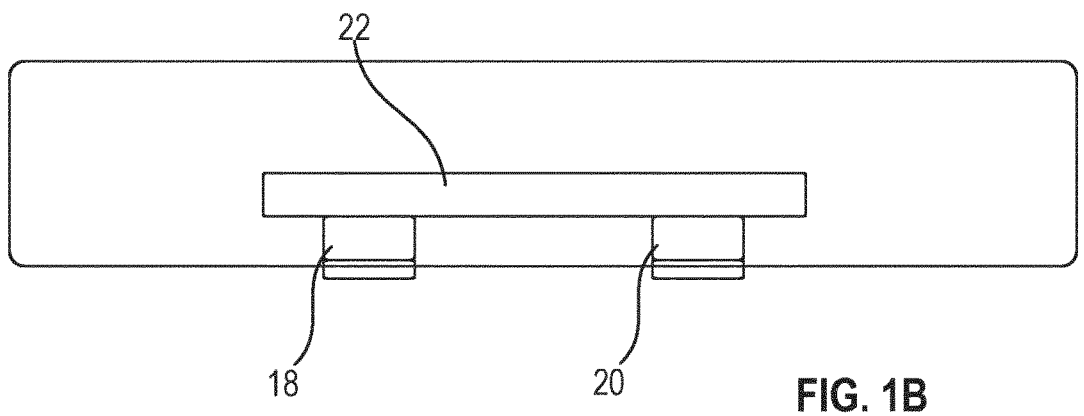
FIG. 1B is a side cross sectional view of a block diagram of an embodiment of a spectroscopy device in accordance with the present invention.
Figure 1C:
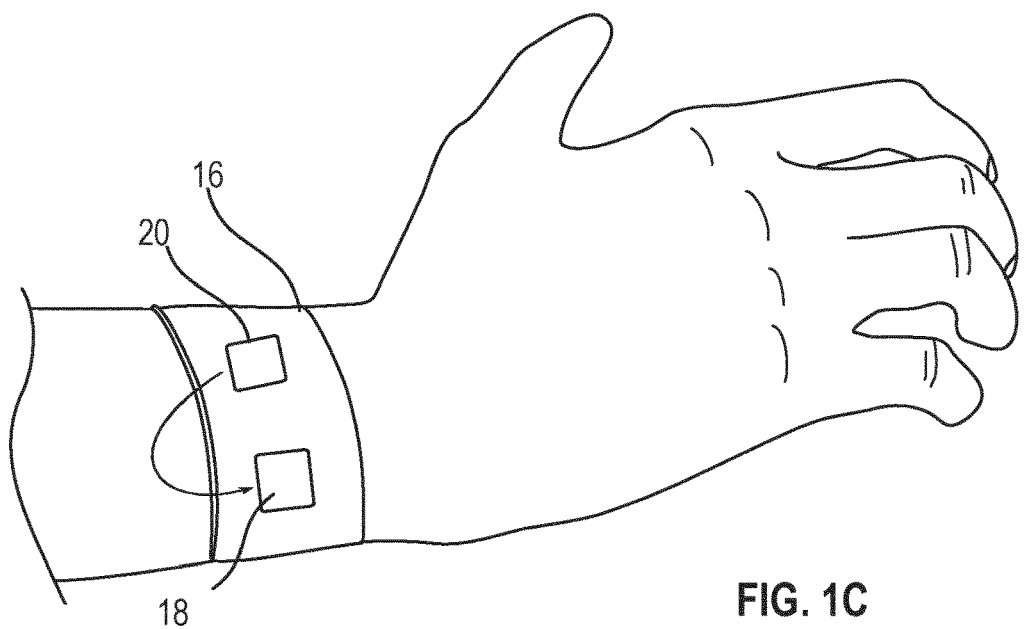
FIG. 1C is a side cross sectional view of a block diagram of an embodiment of a spectroscopy device in contact with skin and tissue in accordance with the present invention.

FIGS. 1A, 1B and 1C illustrate an example configuration of a spectroscopy device 16 with an illumination source 20 and a spectrometer 18. FIG. 1A is a top view of a block diagram of an embodiment of a spectroscopy device 16 including spectrometer 18 and illumination source 20, wherein spectrometer 18 and illumination source 20 are at a predetermined distance from each-other. FIGS. 1B and 1C, respectively, provide a side cross sectional view of a spectroscopy device 16 and a side cross sectional view of a block diagram of an embodiment of a spectroscopy device 16 in contact with skin and tissue.

FIG. 1B illustrates how the illumination source 20 and the spectrometer 18 extend beyond the surface of the spectroscopy device 16 to, to substantially contact the skin area of interest. As shown in FIG. 1B, the illumination source 20 and the spectrometer 18 are combined on an electronic substrate 22 which may be one of a printed circuit board, a semiconductor substrate, a thin film substrate and a flexible substrate. FIG. 1C provides an example of how electronic substrate 22, when present in a spectroscopy device 16, can provide for substantial contact of spectrometer 18 and illumination source 20 with skin and/or tissue. Light from illumination source 20 penetrates into the skin, and optionally into the underlying tissue, leaving the surface at a location dependent on its wavelength and the attributes of the skin along with, optionally, underlying tissue. Spectrometer 18 can capture the light passed from the skin at that location.

In an example embodiment spectrometer 18 includes one or more complementary metal-oxide-semiconductor (CMOS) optical sensors with integrated interference-based (e.g. Fabry-Perrot) bandpass filters spanning a range of 400 nm-1100 nm, and a wideband illumination source including one or more light emitting diodes (LEDs). In an example the one or more LEDs are coated with phosphors to enable illumination across the full wavelength range. In an example both the CMOS optical sensor and the one or more LEDs can be mounted on a common electronic substrate 22. In another example, the spectrometer 18 can be used alone or in combination with other elements to control the one or more LEDs during operation of spectroscopy device 16. In another example, the sensor is an InGaAs sensor with spectral range and spectral filters in the range of 900 nm-1800 nm. Spectroscopy device 16 can be integrated into a variety of apparatus having different form factors, including, but not limited to body wearables, e.g. watch, bracelets, patches, in-ear devices, over-ear devices, headsets, nose clips, rings, anklets, textiles, footwear, handheld devices, ingestibles (e.g. smart pills), instruments for internal examination like an endoscopy tip, headgear such as a head band, helmets or head straps, patches such as chest patches, hearables such as ear phones or ear pods, and wrist wearables such as smartwatches, bracelets and trackers.

Spectroscopy device 16 can be directly attached to or brought in close proximity to the skin of humans or animals at one or more suitable locations. Additionally, spectroscopy device 16 can be brought into contact or near contact with the skin area of interest in different ways. For example, adhesive or straps can be utilized to keep a patch or membrane in tight proximity to the skin. In another example the patch or membrane can also be integrated into gear or clothing that is itself in close proximity or in contact with skin, such as socks, T-shirts, gloves, stockings, underwear, bandages, shoe insoles, headgear, hearables, wrist wearables and finger wearables such as a ring. The device can also be incorporated in devices which are easily contacted by skin, such as handheld instruments or devices, eyepieces or eyeglasses.

In an example, spectroscopy device 16 can provide for both single-use and multi-use applications. The relative size and cost of spectroscopy device 16 can allow it to be integrated into disposable wearables intended for single-use, and in other examples, the same or similar spectroscopy device 16 can also be integrated for application in objects that are intended to use for considerably longer periods of time.

Spectroscopy device 16 can provide for simultaneous measurement of multiple physiological parameters. The spectrometer will enable collection of data with high spectral resolution (for example <10 nm) in a wide spectral range (for example >100 nm). In an example, collected data associated with different physiological parameters influencing light passing through tissue can be derived using appropriate algorithms. Algorithms for deriving related physiological parameters can be any algorithm sufficient to extract information from the chemical systems associated with skin and or tissue, including one or more of chemometric algorithms, multivariate classification algorithms and response algorithms. In an example, different parameters such as heart rate, blood oxygenation, body fat, body hydration, blood pressure, muscle lactate, etc. can be optically measured using a combination of specific wavelengths captured by spectroscopy device 16. Accordingly, instead of using a different apparatus with different optical responses for each of a plurality of parameters, a single spectroscopy device 16, utilizing a miniaturized spectrometer 18, can be used to measure multiple physiological parameters. In an example, the multiple parameters are measured simultaneously; in another example the multiple parameters are measured in a time divided manner. In yet another example, some parameters are measured simultaneously while others are measured in a time divided manner.

In an example, the use of spectroscopy device 16 can be simple and seamless, as its application is not restricted to hospitals or clinics where it is to be used by trained personnel. In an example, the device can be placed on the skin and operated easily by trained personnel. In another example, simple and easy-to-follow instructions can be provided to allow a user to apply the device it to their own skin or to the skin of an animal. Hence, in an embodiment the device allows collection of data for diagnostic or monitoring purposes in inexpensive way without being restricted to specialized environments.

In an example, spectroscopy device 16 can also provide for software and hardware upgradeability. In an example data collected over a full or partial spectral range of the range of wavelengths available to spectroscopy device 16 can be collected with as fine of resolution available in the device, even beyond and irrespective of which parameters of the area under examination influences the irradiated light. Accordingly, in an example, when new parameters are discovered by the scientific community or measurements of additional parameters are needed for a person or an animal, or when it is observed that other wavelengths provide more accurate or stable data, the raw data is already available and, in an example, a relatively easy software change/upgrade can be implemented. In an embodiment, a dataset can be analyzed again with upgraded or enhanced chemometric algorithms, thereby avoiding the overhead of re-acquiring the data from the skin area of interest. In another embodiment, spectroscopy device 16 is configured to apply upgraded or enhanced chemometric algorithms contemporaneous with collection of the output wavelengths.

Such a device can contain one or more monolithically integrated spectrometers 18 and/or one or one monolithically integrated illumination sources 20. In these embodiments a multicomponent spectroscopy device 16 allows for the collection a spatial spectral response from the skin area of interest over a plurality of wavelengths ranges. In an example, the wavelength ranges are specific to each of the one or more monolithically integrated spectrometers. In another example, each of the monolithically integrated spectrometers 18 is configured to collect spectral responses for a plurality of selected wavelengths.

Figure 2A:
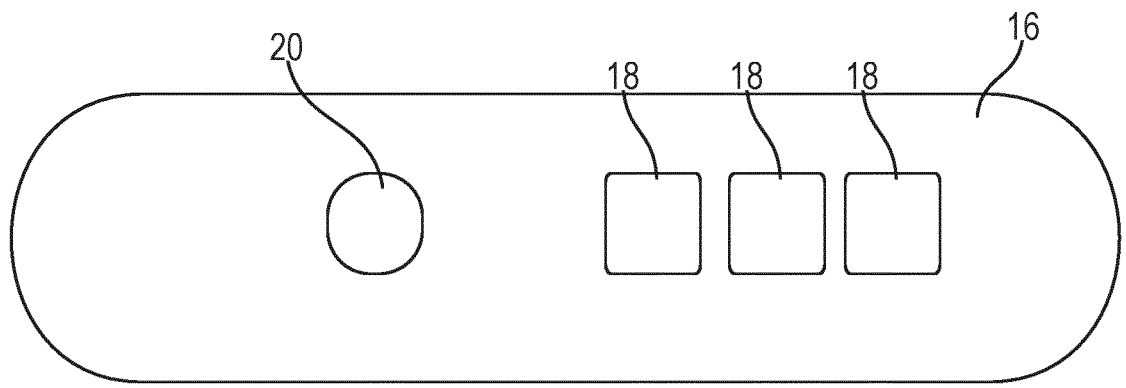
FIG. 2A is a top view of a block diagram of another embodiment of a spectroscopy device in accordance with the present invention.
Figure 2B:
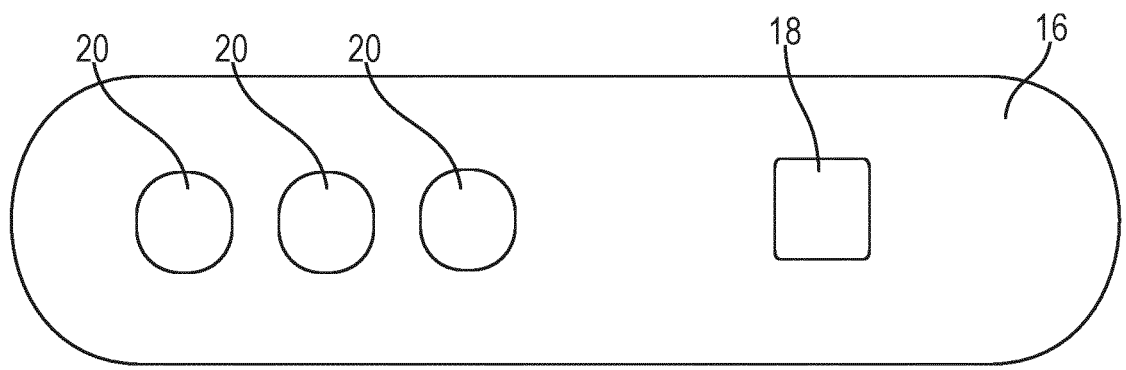
FIG. 2B is a top view of a block diagram of another embodiment of a spectroscopy device in accordance with the present invention.

FIG. 2A provides a top view of an embodiment of a spectroscopy device 16 with one illumination source 20 and three spectrometers 18 at progressively longer distances from illumination source 20. In an example, each spectrometer 18 is located a different predetermined distance from illumination source 20. In use, this configuration allows capture of irradiated light returning light propagating from different locations within the skin, and optionally from underlying tissue. FIG. 2B provides a top view of an embodiment of a spectroscopy device 16 with 3 illumination sources, each at a predetermined distance from that spectrometer. In an example, when more than one illumination source 20 is used, each of the different illumination sources 20 may or may not have a different range of wavelengths to make use of the properties of different wavelengths having different penetration depths in the skin and tissue, or to observe parameters at different depth.

Figure 2C:
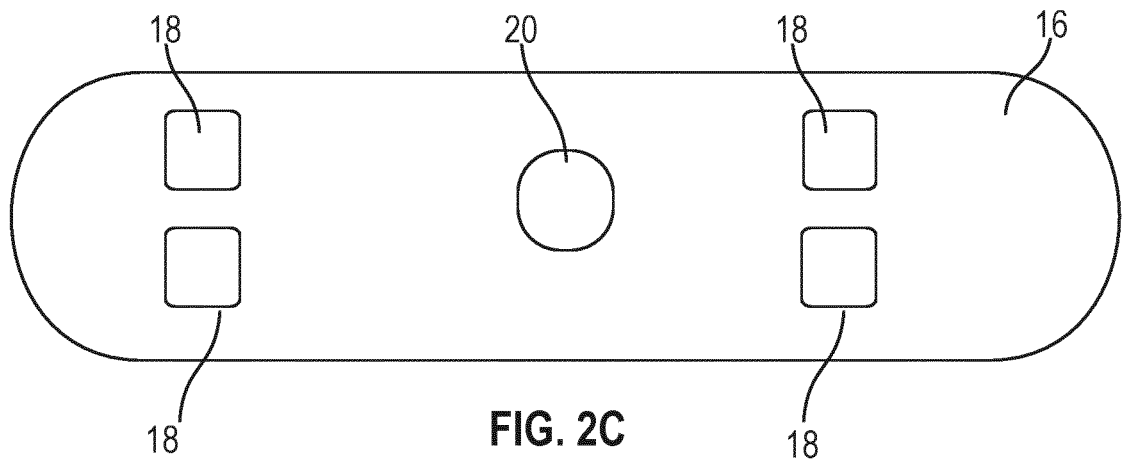
FIG. 2C is a top view of a block diagram of another embodiment of a spectroscopy device in accordance with the present invention.
Figure 2D:
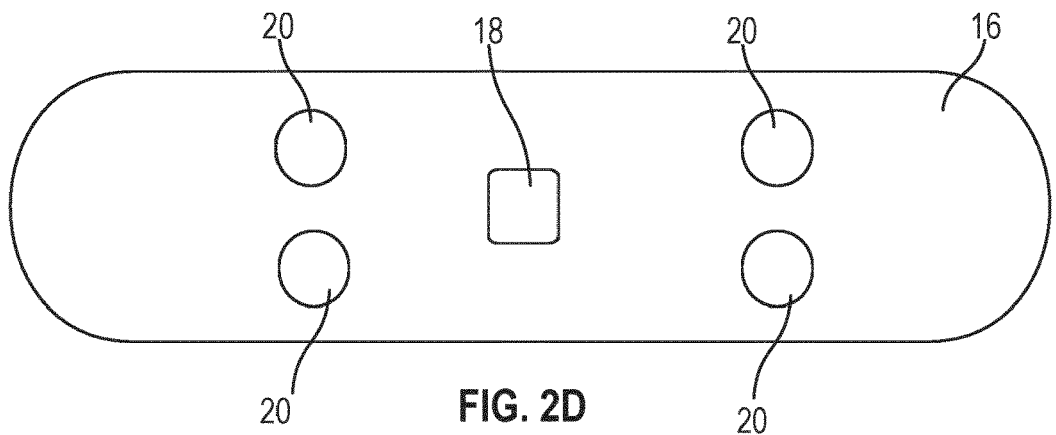
FIG. 2D is a top view of a block diagram of another embodiment of a spectroscopy device in accordance with the present invention.

FIG. 2C provides a top view of an embodiment of a spectroscopy device 16 having a combination of one illumination source 20 with 4 spectrometers 18 located around the illumination source at predetermined distances from the illumination source 20. FIG. 2D provides a top view of an embodiment of a spectroscopy device 16 having a combination of one spectrometer 18 with 4 illumination sources 20 spread around the spectrometer 18, where each of illumination sources 20 is located at predetermined distances from the spectrometer 18. In an example, this configuration allows obtaining a spatial optical response from the skin. It can also be used to provide more stable data when the device is not accurately aligned over a zone of interest, for example by averaging out all data, or by enabling the different illumination sources 20 in a time divided manner, thereby allowing inspection of the data for a correct, targeted or expected response.

Figure 3A:
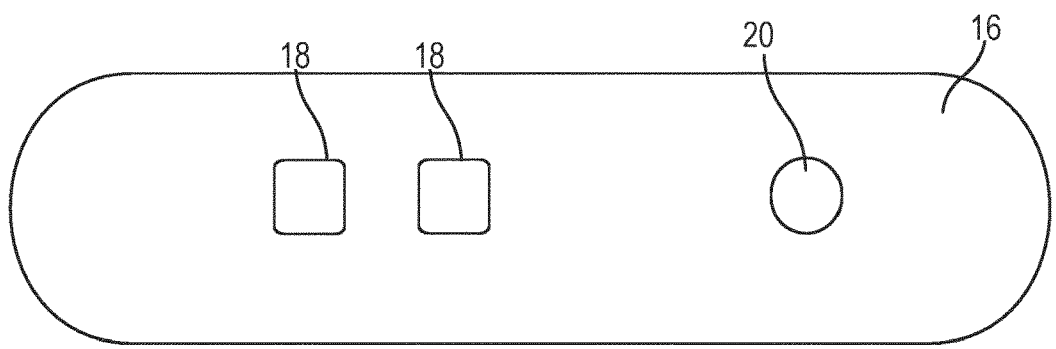
FIG. 3A is a top view of a block diagram of another embodiment of a spectroscopy device in accordance with the present invention.
Figure 3B:
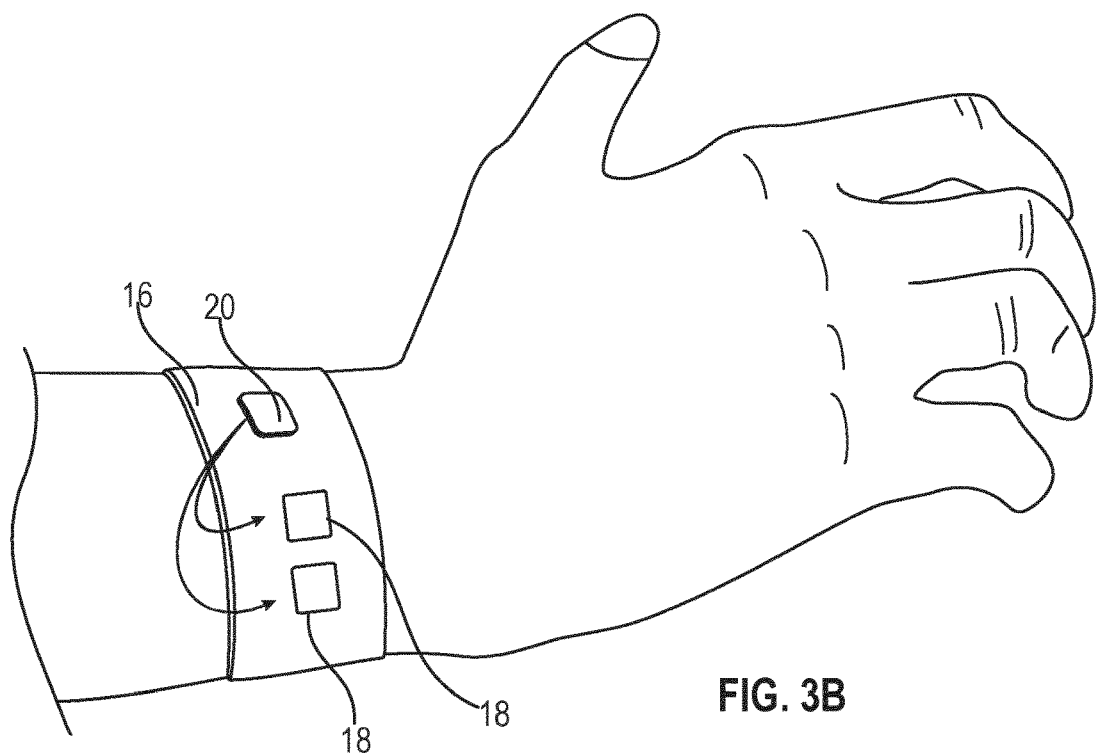
FIG. 3B is a side cross sectional view of a block diagram of another embodiment of a spectroscopy device in contact with skin and tissue in accordance with the present invention.

FIG. 3A provides a top view of an embodiment of a spectroscopy device 16 having on illumination source 20 and two spectrometers 18 located at different predetermined distances therefrom. FIG. 3B provides a side cross sectional view of another embodiment of a spectroscopy device 16 showing an example of spectroscopy device 16 in contact with the skin. In the example, light irradiated by the illumination source 20 can reflect at different depths, with the reflected light leaving the skin surface at different locations. Different spectrometers 18 at a particular position relative to the illumination source 18 can collect reflected light from a particular depth in the tissue.

Figure 4A:
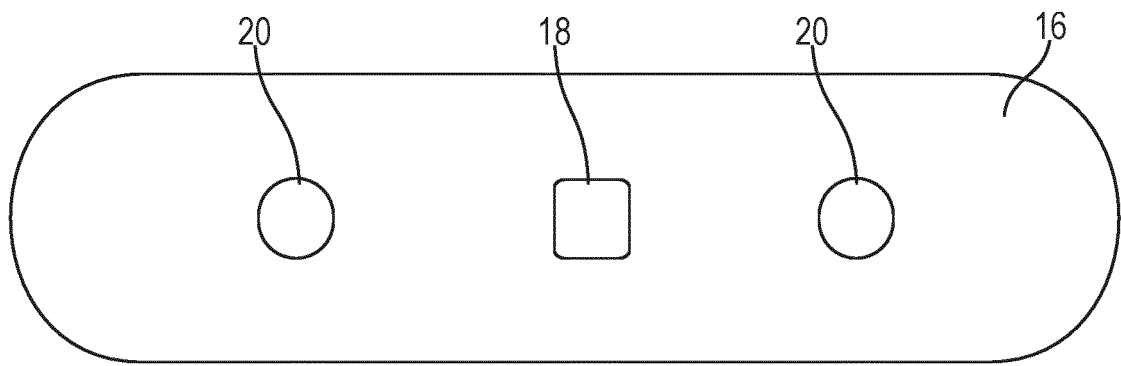
FIG. 4A is a top view of a block diagram of another embodiment of a spectroscopy device in accordance with the present invention.
Figure 4B:
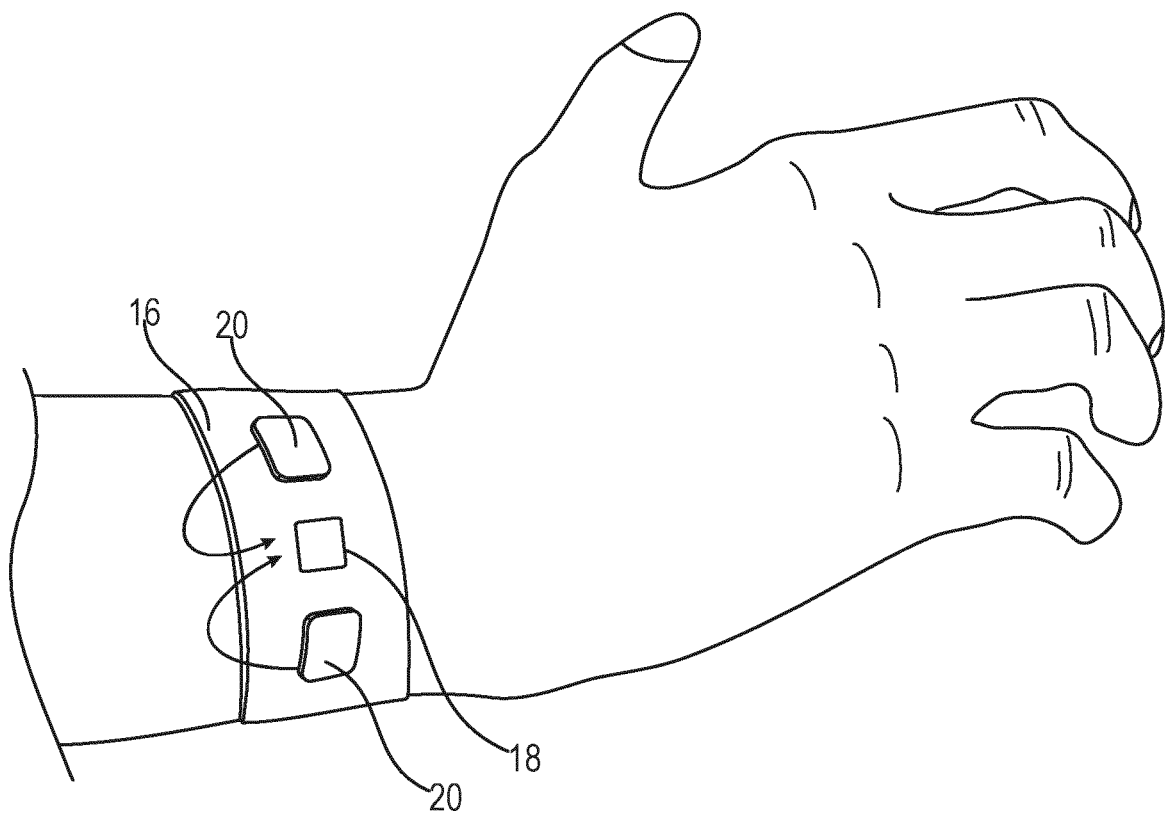
FIG. 4B is a side cross sectional view of a block diagram of another embodiment of a spectroscopy device in contact with skin and tissue in accordance with the present invention.

FIG. 4A provides a top view of an embodiment of a spectroscopy device 16 having one spectrometer and two illumination sources 20 located at different predetermined distances therefrom. FIG. 4B provides a side cross sectional view of another embodiment of a spectroscopy device 16 showing an example of spectroscopy device 16 in contact with the skin. In the example, light irradiated by an illumination source 20 will reflect and, part of it, is captured by the spectrometer 18. As captured light is collected from different illumination sources 20, the collected data provides a spatial response of the skin at the wavelength ranges of the illumination sources 20. In an example the illumination sources 20 may be configure to provide illumination at the same or different range of wavelengths.

Figure 5:
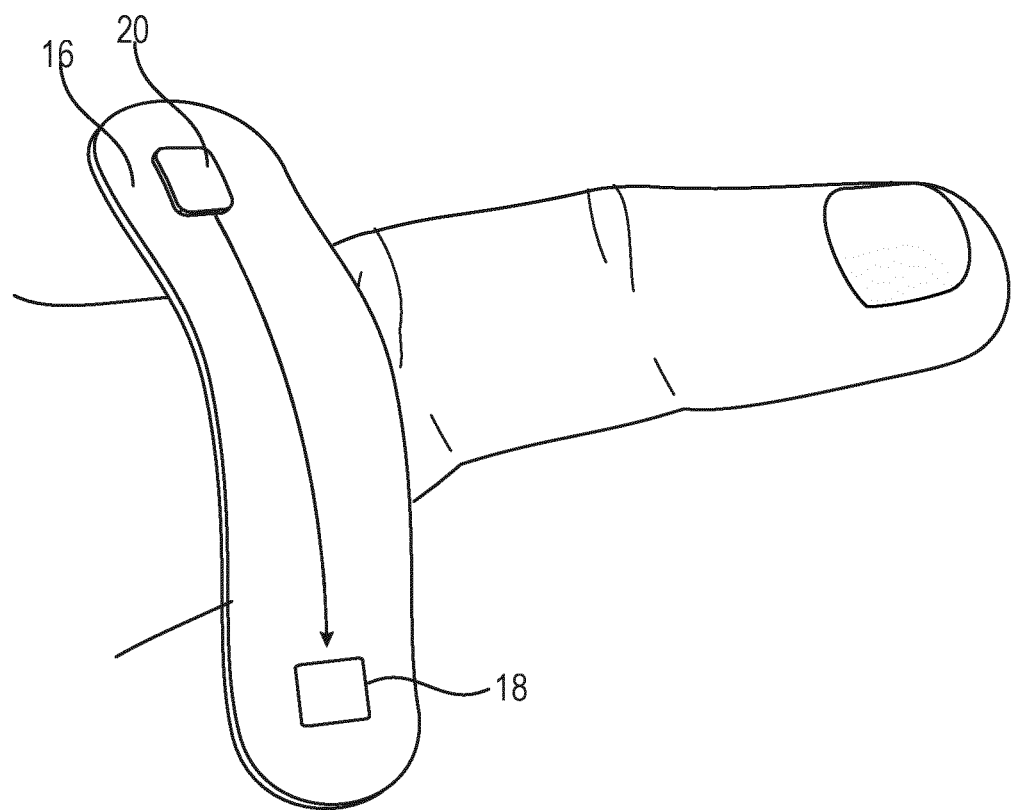
FIG. 5 is a top view of a spectroscopy device for transmitting light through skin tissue in accordance with the present invention.

In each of the examples above the spectroscopy can include reflectance spectroscopy, as well as transmission spectroscopy, as illustrated in FIG. 5. In an example, the described configurations for placement of spectrometer 18 and illumination sources 20 are applicable for transmission spectroscopy as well. In an example, when the spectroscopy desired is transmission spectroscopy the spectrometers 18 and illumination sources 20 need not be located on the same plane during operation. In case of transmission spectroscopy, the spectrometer(s) 18 and illumination source(s) 20 should be on opposite sides such that at least a portion of the tissue from a body part (for example fingertip, ear lobe, nose, etc.) under measurement is in between the spectrometer(s) 18 and the illumination source(s) 20. FIG. 5 provides an impression of the device containing one monolithically integrated illumination source 20 and one monolithically integrated spectrometer 18. In an example, spectroscopy device 16 is incorporated in a ring-shape apparatus whereby the spectrometer 18 and illumination source 20 are at not in the same plane, for example facing each-other. In an example this configuration provides for measuring irradiated light transmitted through a body part or a portion of a body part.

Instead of using just a single spectroscopy device 16, more than one spectroscopy device 16 can be used, each located at a different location of interest. Such a network of devices can enable simultaneous measurements at multiple locations on skin and/or tissue. In an example multiple measurement can be used to obtain enriched data consisting of both temporal and spatial data, as well as to improve the robustness and accuracy of collected data by obtaining baseline or reference measurements from one or more device. Parameters measured, such as measures of blood oxygen saturation (SpO2), CO saturation (SpCO), tissue oxygenation (StO2), total hemoglobin index (THI), pulse rate (PR), pulse rate variability (PRV), tissue hydration, body fat percentage, etc. can then be based on measurements obtained from different locations on the body. In use, the device can be placed the desired locations, such as at an arm, e.g. at wrist, forearm or upper arm, at a finger, on the forehead, at an earlobe, in the ear, on the skull, on the chest, on the back, on a muscle, on a wound, a leg, a foot, animal skin, on an udder.

In an example, fat and water measurements can be obtained from two locations. Fat from a location where the body is sensitive to fat and water from a location where the body is more sensitive to water. These two measurements can then be combined to come to a more accurate measurement supported by empirical or historical body fat models.

For example, two spectroscopy devices 16 can be used. In an example, one spectroscopy device 16 is used on a healthy tissue or control tissue, and another spectroscopy device 16 is used on tissue of interest. The data from both spectroscopy devices 16 can be combined to isolate the relevant parameters of difference between the two measurements. For example, standard skin parameters such as skin tone can be removed by measuring them on a control spectroscopy device 16, and de-embedding them from the data of the other spectroscopy device 16. In another application, one spectroscopy device 16 is used on a healthy healing wound, while another spectroscopy device 16 is used on a poorly healing wound, allowing a comparison of the healing processes between the healthy and poor healing wounds.

Figure 6:
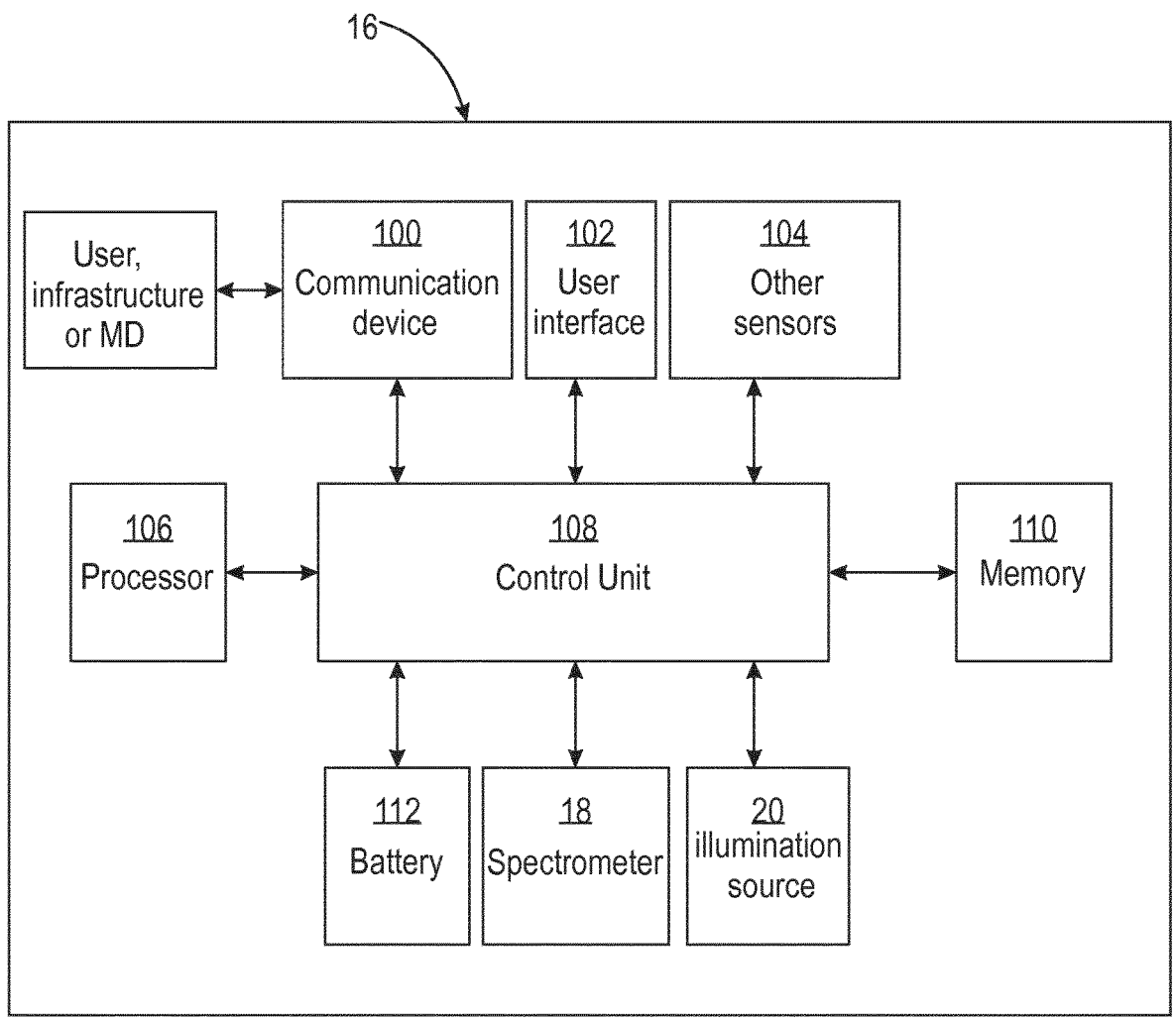
FIG. 6 is a block diagram of a configuration for a spectroscopy device in accordance with the present invention.

FIG. 6 illustrates an example embodiment of a configuration for spectroscopy device 16. In an example spectroscopy device 16 can comprise one or more of the components below.

Spectrometer 18: one or more miniaturized spectrometers based on integrated device manufacturing technology and filters on top of it. Preferably these filters are monolithically integrated with the sensor, such as the CMOS sensor discussed above, or can be attached to the sensor. In an example, these filters can be interference-based filters such as, for example, Fabry-Perrot filters. Other types of interference-based filters, such as thin film filters or plasmonic filters, can be used. In an example, the spectrometer 18 is very small, such that it can be integrated into a wearable apparatus without comfort loss, for example 3 mm×3 mm×2 mm in size.

Illumination source 20: One or more illumination sources 20 can contain one or more Light Emitting Diodes (LEDs) or Vertical Cavity Surface Emitting LEDs (VSCELs) covering the wavelengths of interest. They may also contain one or more LEDs with phosphor coatings to extend the spectral range of the LED. In an example the LEDs can contain a combination of wideband (phosphor-based) LEDs and narrow-band LEDs. Illumination source 20 can also include other light sources such as small halogen lamps.

In an example, user interface functionality can depend on the type of apparatus in which the device is implemented. For example, in case of a patch, user interface 102 can be a button, a haptic sensor or other device through which the user can give input to the patch. User interface 102 can also be a monitor, a haptic sensor or other device through which a user can get feedback from the patch. In an example, the case of a smartphone or smartwatch, a regular interface of the smartphone or smartwatch may also act as an interface to spectroscopy device 16 for both providing inputs to the spectroscopy device 16 and/or receiving data and feedback from spectroscopy device 16.

Memory 110: memory 110 can be included to store collected data and/or instructions. Depending on the type of apparatus in which one or more spectroscopy devices 16 is implemented, the memory can either be dedicated for spectroscopy device 16 or shared with other functionalities of the apparatus, e.g. a smartphone. In an embodiment, memory 110 can contain instructions for executing a chemometric algorithm for deriving one or more physiological parameters influencing the irradiated light. In another embodiment, the memory stores specific calibration parameters related to the spectrometer, such as, for example, its illumination or optics. In yet another embodiment, the memory stores specific biometric data of the user locally. The memory can of any type, including, but not limited to volatile memory, non-volatile memory, etc.

Communication device 100: in an example, communication device 100 can be used to exchange data with peripheral devices. Depending on the peripheral device, communication device 100 can either be dedicated for spectroscopy device 16 or shared with other functionalities of an apparatus, such as a smartphone.

Battery 112: In an example, one or more batteries 112 can be included to power spectroscopy device 16. Battery 112 can be dedicated or shared depending on an intended peripheral device. Battery 112 can be one-time chargeable or rechargeable. In an example when battery 112 is rechargeable it can be charged either wirelessly or through a wired connection. In an example, when spectroscopy device 16 is powered by a cable interface, an integrated battery may not be needed.

Processor 106: In an example processor 106 processes and manages the collection of data acquired from spectrometer 18. Depending on the end peripheral device, it can be dedicated or shared.

Other sensors 104: in addition to the optical sensor network containing an illumination source and a spectrometer, other sensors 104 can be present. Examples of such other sensors include EKG sensors, inertial measurement unit (IMU), electrical impedance sensor or any other sensor which can be used to obtain other sensory information to correlate to or complement collected spectral data.

Control unit 108: In an example, control unit 108 controls one or more components of spectroscopy device 16. In an example, this may also contain artificial intelligence to continuously adapt the device for improved quality of the obtained data, improved operation or reduced power consumption.

By controlling and duty cycling spectroscopy device 16, a low-power portable solution can be realized, which can be used for a long term or continuous monitoring or data collection. In an embodiment spectroscopy device 16 can be configured to, in a low power mode, irradiate light in a narrow band. In the example, irradiated energy is only present in this narrow band of wavelengths and can be used in an energy-efficient way to probe the skin area of interest. Due to low power consumption, such a measurement can be used to provide long term and/or continuous monitoring of skin or tissue. In an example, spectral data is logged over time to obtain a time-varying response. In another example one or more narrow-band ranges may be used for heart-rate or SpO2 measurements. In an example, spectroscopy device 16 can be configured to, in a higher power mode, irradiate light in a broad band. In the example, irradiated energy is thus spread out over a broader range of wavelengths. For power consumption reasons, such a measurement could be sporadic and/or limited in time. In an example, spectroscopy device 16 can switch between such a continuous monitoring mode and a sporadic monitoring mode. A sporadic mode can be used, for example, when obtaining a confidence image of the skin as discussed further.

In an example, the measured data is transmitted from spectroscopy device 16 wirelessly, allowing for the device to be mobile and wearable. In another embodiment, the data measured by the device can be transferred in real-time. In another embodiment the data could be transferred on request or based on a duty cycle. In an example the data can be stored locally on the device in a memory.

Spectroscopy device 16 can be integrated into wearable apparatus with data processing capabilities such as a smartphone or a smartwatch. Apparatus such as patches and tags can wirelessly connectable to a dedicated receiver, which is further capable of storing and processing collected data. In an example an apparatus may be standalone or connected to a public or private information and/or data sharing network. In an example an apparatus can be configured to provide the necessary user interface to operate one or more spectroscopy devices 16.

In an example, other sensors types can be added to spectroscopy device 16 to improve the quality of the data. For example, an ECG sensor may be added to correlate ECG data to optical data. For example, an accelerometer can be added to correlate motion to the spectroscopic data and to assist in the disregarding of invalid data, or correcting the captured data for motion artifacts. Spectroscopy device 16 can further contain software for controlling the operation of spectroscopy device 16, such as selecting the measurement mode and/or to select which parameters are to be measured during an irradiation step.

In an example of measuring and analyzing the spectrophotometric parameters of water, such as hydration, a method comprises locating spectroscopy device 16 on skin, capturing the irradiated light, using the first measurement as a confidence image to assess whether an actual skin is measured, and, once the first measurement has been accredited, analyzing optical data collected. In an example, a first step can be to interpret this collected optical/spectrum data to create a confidence image. In an example, live skin samples are measured by interpreting melanin content. In another example skin and/or tissue is analyzed to determine whether blood features are present. In yet another example, features of the spectrum such as its derivatives can be analyzed in cases where a spectrum with sufficient resolution and quality is available. In yet another example, determination can be made as to whether a measurement is invalid e.g. in case of a bad contact, too much background light, the sensor not being connected to a person or a broken device. In an example, after a confidence assessment, features may be extracted from the spectral data obtained or another measurement is done. For example, fatness level may be extracted. In an example, fat and water features interfere in the spectrum between 900 nm and 1000 nm and water level read in the skin is modulated by an amount of sub-cutaneous fat. Accordingly, an indicator of fatness level may be extracted from the spectrum. Using several illumination sources 20 at different distances, different penetration depths may be extracted, which may help to extract an amount of subcutaneous fat. In an example, an indication of water percentage or hydration can be extracted from the same spectrum by taking into account the amount of fat.

In another example using the same type of spectral measurements, blood parameters, such as total hemoglobin level may be extracted and the amount of oxygen or water in blood, which are otherwise unstable can be measured. In an example, related measurements can be used as a reference to actual water measurements, which may be more sensitive to skin type or other non-idealities.

Using multiple spectrometers 18 and/or multiple illumination sources 20 data associated with different depths under the skin or in the tissue can be collected. In an example, this data can be used to correct for aberrations such as sweat when measuring body hydration. For example, a spectrometer closely spaced to the illumination source can detect hydration which is on the surface of the skin, as it will receive light reflected from or near the skin surface. A spectrometer farther spaced relative to an illumination can detect the hydration deeper in the tissue. Combining both data can help to isolate the target portion of hydration of interest.

In another embodiment, a wideband Light Emitting Device (LED) (e.g. >50 nm) and a narrow-band Light Emitting Device (LED) (e.g. <50 nm) are placed together with a spectrometer 18 in a single device to provide for hybrid spectral measurement. When the wideband LED is enabled, the full optical spectrum can be excited. Spectrometer 18 can be used to measure certain body parameters through measuring the full spectrum (for example hydration). In another embodiment, the wideband LED is disabled, and the narrowband LED is enabled, for example a green LED or a red LED (to measure, for example heart rate). Since this LED is narrowband, it can be much more efficient, since substantially all energy is concentrated in a narrow wavelength range, and, for example, no inefficient phosphors are being used, potentially resulting in lower power consumption. Accordingly, measurement parameters that benefit from full spectrum can use the wideband LED. In an example, slowly-varying parameters can be measured in this way, such as water content, methemoglobin, fatness. With the narrowband LED, parameters can be measured that require continuous monitoring, such as heart-rate. Spectroscopy device 16 can thus cycle between two modes, depending on need, to optimize power consumption, as discussed above.

In an example, multiple body parameters are correlated to each other. For example, a certain percentage body water loss is known to indicate body temperature increase and a given beats-per-minute heart rate increase. Using several type of sensors, and using several parameters measured by a wearable spectrometer, collected data may be combined to yield a more accurate or more stable reading. In an example a model can be created with interrelated parameters for diagnostic purposes. For example, simple fluctuations may be related to inaccuracy of measurements if not confirmed by other measurements. In another use case, measurement of fluctuations associated with a first type of parameter in combination with fluctuations in another type of parameter may indicate a particular diagnosis.

Accordingly, a light weight, portable, non-invasive and non-intrusive device, comprises at least one monolithically integrated optical spectrometer and at least one monolithically integrated light source. By integrating a monolithically integrated spectrometer with a filter in a health wearable, acquisition of spectral responses is enabled using a large number of spectral bands, typically 7 or more, instead of being limited to few spectral bands as in state-of-the-art health wearables which are based on multiple discrete narrowband LED or in state-of-the-art devices using optical measurements.

In an example, multiple body parameters can be simultaneously extracted from the acquired spectral responses, thus eliminating the need for different devices for measurement of different parameters. Additionally, one-time use disposable devices such as patches can be provided as well as more expensive reusable devices. In an example, collection of high spectral resolution (i.e. <10 nm) and wide spectral range raw data can provide upgradeability, as the collected data can be reanalyzed for deriving measurements for parameters newly discovered in future or other parameters not measured previously. Collection of high spectral resolution and wide spectral range raw data also enables more robust measurements as data across multiple parameters can be correlated.

Additional example embodiments include a wearable device that contains at least a spectrometer 18 along with its illumination source 20, coupled to the skin, with the addition of a motion sensor. The spectrometer 18 and illumination source 20, operating within the spectral range of 400 nm-1100 nm measure SpO2 from the spectral absorbance of the skin, while the motion sensor collects activity of the person or living subject wearing the device. In an example, both datasets are combined to assess a person's physiological status (such as its pneumological system, the quality of the gas exchange of oxygen in the lungs) wearing the device during periods of activity or rest. Since both healthy or ill persons will typically be able to replenish the oxygen in the body, while ill persons will have, for example, oxygenation issues during periods of activity, whereas health persons will have fewer or none. In another embodiment, the data of SpO2 and activity will be correlated to assess physiological or specifically pneumological health, such as for detection of, or monitoring of COPD or asthma diseases. In yet another embodiment, spectrometer data and optionally activity data can be used for sleep tracking, to identify or monitor sleep disorders, such as for example sleep apnea.

In still another embodiment, a wearable device contains at least a spectrometer 18 along with its illumination source 20 coupled to the skin. The spectrometer 18 and illumination 20, operating within the spectral range of 400 nm-1800 nm measure SpO2 as well as tissue hydration from the spectral absorbance of the skin. In an example, the hydration measurement data can be used to detect edema, while the SpO2 can be used to measure the physiological status of the person wearing the device. In another embodiment, these data are correlated to detect or to monitor the status of treatment for CHF (Congestive Heart Failure) or other cardiovascular diseases.

In another embodiment a wearable device contains at least a spectrometer 18 along with its illumination source 20 coupled to the skin. The spectrometer 18 and illumination source 20, operating within the spectral range of 400 nm-1100 nm measure SpCO from the spectral responses, and may also measure SpO2. In an example, the SpCO data can be measured over time, and used to track smoking patterns of a person wearing the device. In an example these data can be used to help persons in smoke cessation programs. In another example a smokers' patterns are used as a metric for an insurance or personal health assessment. In another example SpCO data can be used for sports health tracking, and physiological capacity of the lungs, or during intensity training. In another example, SpCO and SpO2 are combined and correlated to provide more accurate blood oxygenation data. In another example, SpCO data of many subjects wearing the device are collected to assess pollution patterns in a specific area and the effect of such pollution on a person's blood HbCO (carboxyhemoglobin), by, for example, correlating data associated with large groups of subjects with respect to geological location. This can be done by correlation, data mining or machine learning techniques. These data may also be combined with other data from the area such as weather conditions (e.g. wind, cloudiness, temperature), traffic (e.g. amount of cars, traffic jams), electricity usage (e.g. as a proxy for industrial activity), geological conditions (e.g. mountains or seaside), etc.

FIG. 7 illustrates the relationship between absorbance and light wavelength for oxyhemoglobin (HbO2), reduced hemoglobin (HbR), methemoglobin (HbMeth) and carboxyhemoglobin). As illustrated in FIG. 7, the different oxyhemoglobin forms have different spectral signature of its absorption at different wavelengths. Similarly different signatures can be shown for various other skin and tissue parameters. Water, for example, has different absorption "bands" that can allow for differentiation from hemoglobin. As a further example, differential absorption at three wavelengths 1720, 1750, and 1770 nm, have been shown to correspond to the lipid vibrational bands that lay "in between" prominent water absorption bands.

FIGS. 8*a*, *b* and *c* illustrates the configuration with an illumination source, e.g. monolithically integrated, and one spectrometer. FIG. 8*a* gives a schematic top view of such device whereby the illumination source and the spectrometer are at a predefined distance from each-other. FIG. 8*b* gives a schematic cross-sectional view of this device, illustrating how the illumination source and the spectrometer extend beyond the surface of the device to, when in use, contact the skin area of interest. As shown in FIG. 8*b*, the illumination source and the spectrometer are combined on an electronic substrate, e.g. a printed circuit board, a semiconductor substrate or a thin film substrate. FIG. 8*c* gives an impression on how the module, when present in a patch, is in contact with the skin. The light irradiated by the illumination source into the skin propagates into the skin, optionally into the underlying tissue, and leaves the surface at a location depending on its wavelength and the skin, optionally underlying tissue, parameters. The spectrometer captures then the light which leaves the skin at that location.

An example of an embodiment may be a spectrometer built using a CMOS optical sensor with integrated interference-based bandpass filters spanning a range of 500 nm-1000 nm, and a wideband illumination consisting of an LED coated with phosphors to enable illumination across the full wavelength range. Both components could be mounted on a common substrate. The spectrometer may control the LED in accordance to perform the measurement. The device used for such diffuse optical spectroscopy can be integrated into several apparatus having different form factors such as body wearables, e.g. watch, bracelet, patch, in-ear, over-ear, headset, nose clip, ring, anklet, textile, footwear, handheld devices, ingestibles, e.g. smart pills, instruments for internal examination like an endoscopy tip, headgear such as a head band, helmet or head strap, hearables such as ear phones or ear pods, wrist wearables such as a smartwatch, a bracelet or a tracker.

Such a device can be directly attached to or brought in close contact with the skin of humans or animals at one or more suitable locations. The device can be brought into contact with the skin area of interest in different ways. Adhesive or straps can be present to keep a patch tight to the skin. The patch can also be integrated in gear or clothing which is contact with the skin, such as socks, T-shirts, gloves, underwear, bandage, shoe insoles, headgear, hearables, wrist wearables, finger wearable such as a ring. The device can also be incorporated in devices which are easily contacted by skin, such as handheld instruments or devices, eyepieces or eyeglasses.

The device can enable both one time and multi time use cases. The extremely low size and low cost of such a device allows them to be integrated into wearable disposables intended for one time use. On the other hand, the same devices can also be integrated in devices which are used for considerably longer period of time.

Such a device can provide, preferably, simultaneous measurement of multiple physiological parameters. The spectrometer will enable collection of data with high spectral resolution (for example <10 nm) in a wide spectral range (for example >100 nm). From these data, features related to different physiological parameters influencing the light passing through the tissue can be derived using appropriate chemometric algorithms. It has been well established in literature that different parameters such as heart rate, blood oxygenation, body fat, body hydration, blood pressure, muscle lactate, etc. can be optically measured using a combination of specific wavelengths captured by the spectrometer. Thus, instead of using different apparatus with different optical responses for different parameters, a single device based on a miniaturized spectrometer can measure multiple parameters, preferably simultaneously.

The use of such a device is simple and seamless, as its application is not restricted to hospitals or clinics where it is to be used by trained personnel. The device can be placed on the skin and operated easily by trained personnel. However by simple and easy-to-follow instructions a person can applied it to its own skin or to the skin of an animal. Hence the device allows collection of data from the skin for diagnostic or monitoring purposes in inexpensive way without being restricted to specialized environments.

Such a device is also future-proof. Data over full spectral range of the range of wavelengths available by the device is collected with the fine resolution as available in the device, beyond and irrespective of which parameters of the area under examination influences the irradiated light. Thus, at a later moment, if new parameters are discovered by the scientific community or measurements of additional parameters are needed for a person or an animal, or when it is observed that other wavelengths provide more accurate or stable data, the raw data is already available. The dataset can be analyzed again with appropriate chemometric algorithms, thereby avoiding the overhead of re-acquiring the data from the skin area of interest.

Figure 9:
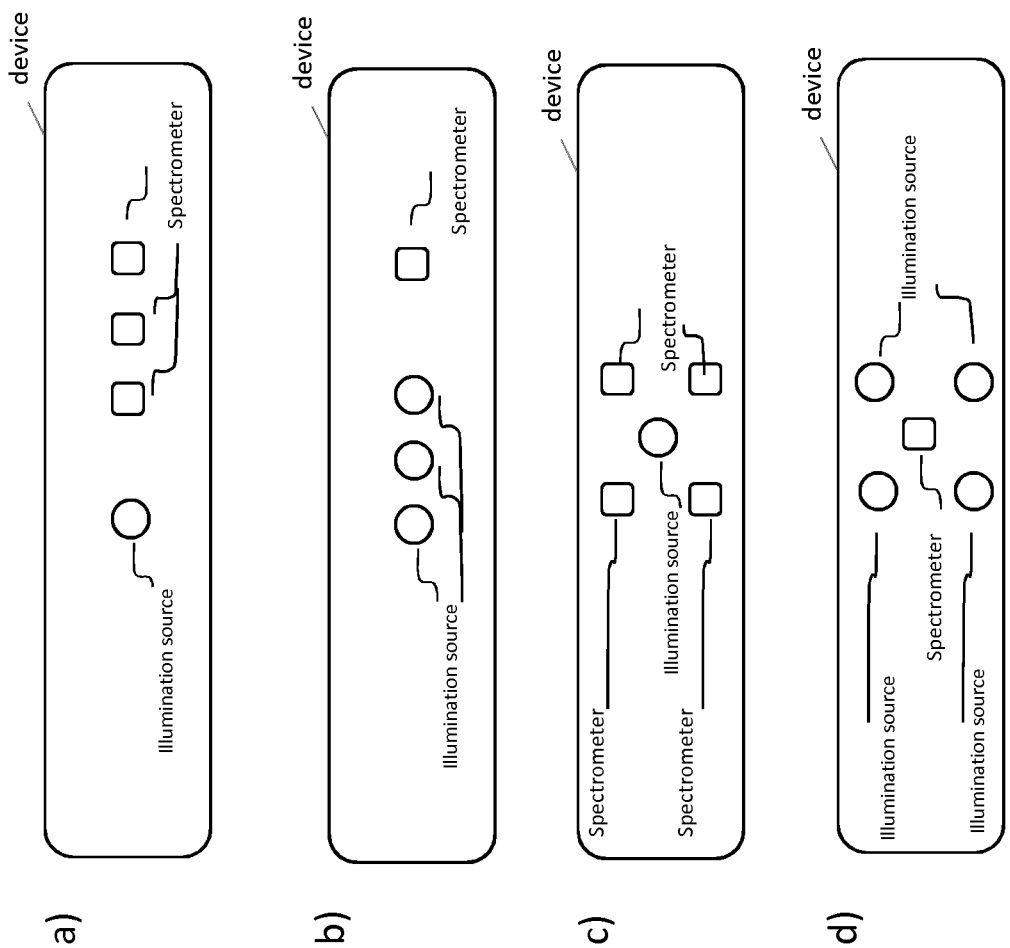

Such a device can contain one or more monolithically integrated spectrometers and/or on or one monolithically integrated illumination sources. Such a multicomponent device allows obtaining a spatial response from the skin area of interest over a selected ranges of wavelengths. FIGS. 9a, b, c and d, FIGS. 10a and b, FIGS. 11a and b illustrates configurations of multiple illumination sources and/or spectrometers.

FIG. 9a shows a row configuration of one illumination source with 3 spectrometers, each at a predetermined distance from that illumination source. In use such configuration allows to capture irradiated light returning from different locations within the skin, optionally underlying tissue. FIG. 9b shows a row configuration of one spectrometer with 3 illumination sources, each at a predetermined distance from that spectrometer. If more than one illumination source is used, the different illumination sources may or may not have a different range of wavelengths as different wavelengths have a different penetration depth in the skin, or to observe features at different depth.

FIG. 9c shows a configuration having a combination of one illumination source with 4 spectrometers spread around the illumination source, at predetermined distances from the source. FIG. 9d shows a configuration having a combination of one spectrometer with 4 illumination sources spread around the spectrometer, at predetermined distances from the spectrometer. Such a configuration allows obtaining a spatial optical response from the skin. It can also be used to provide more stable data when the device is not accurately aligned over the zone of interest, for example by averaging out all data, or by enabling one by one the different illumination sources and inspecting the data for the correct, targeted or expected response.

FIG. 10a shows a schematic top view of a device having on illumination source and two spectrometers at different predetermined distance therefrom. FIG. 10b how gives an impression on how the module, when present in a patch, is in contact with the skin. Light irradiated by the illumination source will reflect at different depths, whereby the reflected light leaves the skin surface at different locations. The different spectrometers at a particular position relative to the illumination source, will pick up reflected light from a particular depth in the tissue.

FIG. 11a shows a schematic top view of a device having one spectrometer and two illumination sources at different predetermined distance therefrom. FIG. 11b how gives an impression on how the module, when present in a patch, is in contact with the skin. Light irradiated by an illumination source will reflect and, part of it, is captured by the spectrometer. As the captured light stems from different illumination sources, this measurement provides a spatial response of the skin at the wavelength ranges of the illumination sources. Also here the illumination sources may have the same or different range of wavelengths.

The spectroscopy can be reflectance spectroscopy as illustrated by the figures above. It can also be transmission spectroscopy, as illustrated in FIG. 12. The above described configurations for placement of spectrometer and illumination sources are also applicable. Unlike the case of reflectance spectroscopy, spectrometer and illumination sources may not be in the same plane during operation. In case of transmission spectroscopy, the spectrometer(s) and illumination source(s) should be on opposite sides such that the body part (for example fingertip, ear lobe, nose, etc.) under measurement is in between the spectrometer(s) and the illumination source(s). FIG. 12 shows an impression of the device containing one monolithically integrated illumination source and one monolithically integrated spectrometer. The device is incorporated in a ring-shape apparatus whereby the spectrometer and illumination source are at not in the same plane, preferably facing each-other. In use this allows also measuring irradiated light transmitted through the body.

Instead of only using a single device, more than one device can be used, each a different location of interest. Such a network of devices enables simultaneous measurements at multiple locations on the skin. These multiple measurements can be used to obtain more enriched data consisting of both temporal and spatial data, as well as to improve the robustness and accuracy of data by obtaining baseline or reference measurement from one or more device. The parameters measured, such as measures of blood oxygen saturation ($SpO_2$), CO saturation (SpCO), tissue oxygenation ($SmO_2$), total hemoglobin index (THI), pulse rate (PR), pulse rate variability (PRV), tissue hydration, body fat percentage, etc. may then based on measurements obtained from different locations on the body. In use, the device can be placed the desired locations, such as at an arm, e.g. at wrist, forearm or upper arm, at a finger, on the forehead, at an earlobe, in the ear, on the skull, on the chest, on the back, on a muscle, on a wound, a leg, a foot, animal skin, on an udder.

For example, fat and water measurements can be obtained from two locations. Fat from a location where the body is sensitive to fat and water from a location where the body is more sensitive to water. These two measurements can then be combined to come to a more accurate measurement supported by empirical or historical body fat models.

For example, two devices can be used. On device is applied on a healthy tissue or control tissue, and another one is applied on a tissue of interest. The data from both devices can be combined to isolate the relevant parameters of difference between the two measurements. For example, standard skin parameters such as skin tone can be removed by measuring them on the control device, and de-embedding them from the data of the other device. In another application, one device is applied to a healthy healing wound, while another device is applied on a poorly healing wound allowing to compare the healing processes. FIG. 13 illustrates an embodiment of a device configuration. This device may comprise one or more of the following components:

Spectrometer: one or more miniaturized spectrometers based on integrated device manufacturing technology and filters on top of it. Preferably these filters are monolithically integrated with the sensor or can be attached to the sensor. These filters are interference-based filters such as, for example, Fabry-Perrot filters. Other types of interference based filter, such as thin film filter or plasmonic filters, can be used.) The spectrometer is very small such that it can be integrated into a wearable without comfort loss, for example 3 mm×3 mm×2 mm in size.

Illumination: one or more illumination sources. These may contain multiple Light Emitting Diodes LED)s or Vertical Cavity Surface Emitting Led (VSCEL) covering the wavelengths of interest. They may also contain of an LED with phosphor coatings to extend the spectral range of the LED. This may also contain a combination of wideband (phosphor-based) LED and narrow-band LED. This may also contain of other light sources such as small halogen lamps.

User interface: its functionality will largely depend on the type of apparatus in which the device is implemented. E.g. in case of a patch, the interface can be a button, a haptic sensor or other device through which the user can give input to the patch. It can also be a monitor, a haptic sensor or other device through which the user can get feedback of the patch. E.g. in the case of a smartphone or smartwatch, the regular interface of the phone or watch may also act as an interface to the device for both providing inputs to the device and/or receiving data and feedback from the device.

Memory: memory can be present to store collected data and/or instructions. Depending on the type of apparatus in which the device is implemented, the memory can either be dedicated for the device or shared with other functionalities of the apparatus, e.g. a smartphone. The memory thus can contain instructions for executing a chemometric algorithm for deriving one or more physiological parameters influencing the irradiated light.

Communication device: this device is to exchange data with the outside world. Depending on the end device, the communication unit can either be dedicated for the device or shared with other functionalities of the apparatus, e.g. a smartphone.

Battery: if powered by the net, at least one battery is present to power the device. It can be dedicated or shared depending on the end device. The battery may be one-time chargeable or rechargeable. If the battery is rechargeable, then it can be charged either wirelessly or through a wired connection. In case the device is powered by a cable interface, an integrated battery may not be needed.

Processor: the processor handles the measurement data acquired by the device. Depending on the end device, it can be dedicated or shared.

Other sensors: in addition to the optical sensor network containing an illumination source and a spectrometer, other sensors can be present. Examples of such other sensors are ECG sensors, inertial measurement unit (IMU), electrical impedance sensor or other sensors which can be used to obtain other sensory information to correlate to or complement the obtained spectral data.

Control unit: this unit controls the components of the device. This may also contain artificial intelligence to continuously adapt the device for improved quality of the obtained data, improved operation or reduced power consumption.

By controlling and duty cycling the device, a low-power portable solution can be realized, which can be used for a long term or continuous monitoring or data collection. The device can be configured to, in a low power mode, only irradiate light in a narrow band. The irradiated energy is only present in this narrow band of wavelengths and is can be used in an energy-efficient way to probe the skin area of interest. Because of the low power consumption, such measurement can be used to provide long term and/or continuous monitoring of the skin. In such case the spectral data is logged across time to obtain the time-varying response. In a narrow-band range, this may be for example heart-rate or $SpO_2$. The device can be configured to, in a higher power mode, irradiate light in a broad band. The irradiated energy is thus spread out over a broader range of wavelengths. For power consumption reasons, such a measurement should be sporadic and/or limited in time. The device can switch between such a continuous monitoring mode and such a sporadic monitoring mode. Such a sporadic mode can be used when obtaining a confidence image of the skin as discussed further.

The measured data is transmitted from the device, preferably in a wireless way as the device should be wearable. The data measured by the device can be transferred in real-time. If it should be transferred on request, the data can be stored locally on the device in a memory.

The device can be integrated in wearable apparatus with data processing capabilities such as a smartphone, a smartwatch. Apparatus such as patches and tags, are typically wirelessly connected to a dedicated receiver, which further stores and processes the data. These apparatus may be standalone or connected to a public or private information and data sharing network. These apparatus will provide the necessary user interface to operate one or more devices.

Other type of sensors may be added to the device to improve the quality of the data. For example, and ECG sensor may be added to correlate ECG data to optical data. For example, an accelerometer may be added to correlate motion to the spectroscopic data and to disregard invalid data.

The device may contain software for controlling the operation of the device such as selecting the measurement mode, but also to select which parameters are to be measured during an irradiation step.

Several use cases are given to illustrate the use of the device.

Measuring Water and Fat

In one use case, the spectrometer wearable is used for measuring water level.

The method comprises providing the device to the skin, captured the irradiated light coming out of the skin, using the first measurement as a confidence image to assess whether an actual skin is measured, and, once the first measurement has been accredited, optical response of the actual skin is analyzed. A first step may thus be to interpret this spectrum data to create a confidence image. One can extract whether a life skin samples has been measured by interpreting melanin content. One can assert whether blood features are present. One can look into other features of the spectrum such as its derivatives, for which a spectrum with sufficient resolution and quality is required. It can also occur that the measurement would be invalid e.g. in case of a bad contact, too much background light, the sensor not being connected to a person or a broken device. After the confidence assessment, features may be extracted from the spectral data obtained or another measurement is done. For example, the fatness level may be extracted. It is known that fat and water features interfere in the spectrum between 900 nm and 1000 nm. It is known that the water level read in the skin is modulated by the amount of sub-cutaneous fat. The fatness level may be extracted from the spectrum. Using several illumination sources at different distances, different penetration depths may be extracted, which may help to extract the amount of subcutaneous fat. A water measurement can be extracted from the same spectrum by taking into account the amount of fat.

Furthermore, using the same type of spectral measurements, blood parameters may be extracted such as total hemoglobin level and the amount of oxygen or water in blood (which is very stable). These measurements may be used as reference to water measurements, which may be more sensitive to skin type or other non-idealities.

Selective Measurement Depth

Using multiple spectrometers and/or multiple illumination sources can be used to obtain data from different depths under the skin or in the tissue. This can correct aberrations such as sweat as opposed to body hydration. For example, a spectrometer closely spaced to the illumination source can detect hydration which is on the surface of the skin, as it will receive light reflected from or near the skin surface. A spectrometer farther spaced relative to an illumination can detect the hydration deeper in the tissue. Combining both data can help to isolate the target portion of hydration of interest.

Hybrid Spectral Measurement

In another use case, a wideband Light Emitting Device (LED) (e.g. >50 nm) and a narrow-band Light Emitting Device (LED) (e.g. <50 nm) are placed together with a spectrometer in a single device. When the wideband LED is enabled, the full optical spectrum is excited. The spectrometer can measure certain body parameters through measuring the full spectrum (for example hydration). In another mode, the wideband LED is disabled and the narrowband LED is enabled, for example a green LED or a red LED (to measure, for example heart rate). Since this LED is narrowband, it is known to be much more efficient: all energy is concentrated in a narrow wavelength range, and, for example, no inefficient phosphors are being used. This results in a lower power consumption. Therefore, parameters which need the full spectrum can use the wideband LED. Typically, slowly-varying parameters can be measured in this way, such as water content, methemoglobin, fatness. With the narrowband LED, parameters can be measured which require continuous monitoring, such as heart-rate. The device can thus cycle between two modes, depending on the need, to optimize power consumption, as discussed above.

Consolidation of Data

It is known that many body parameters are correlated to each other. For example, an certain amount % body water loss is known to reflect into a known body temperature increase and a given beats-per-minute heart rate increase. Using several type of sensors, and using several parameters measured by the spectrometer wearable, these data may be combined to yield a more accurate or more stable reading. One can also build a model with interrelated parameters with diagnostic purposes. For example, it could be seen that simple fluctuations may be related to inaccuracy of measurements, if not confirmed by other measurements. In another use case, measurement of fluctuations in a first type of parameters in combination with fluctuations in another type of parameters may indicate a particular diagnosis.

Hence, a light weight, portable, non-invasive and non-intrusive device, according to the invention, comprises at least one monolithically integrated optical spectrometer and at least one monolithically integrated light source. By integrating a monolithically integrated spectrometer with a filter in a health wearable enables acquisition of spectral responses using a large number of spectral bands, typically 7 or more, instead of being limited to few spectral bands as in state-of-the-art health wearables which are based on multiple discrete narrowband LED or in state-of-the-art devices using optical measurements. Multiple body parameters can be simultaneously extracted from the acquired spectral responses, thus eliminating the need of different devices for measurement of different parameters, as is the case today. Cheap one-time use disposable devices such as patches can be made as well as more expensive reusable devices. Collection of high spectral resolution (i.e. <10 nm) and wide spectral range raw data provides future proofness as the collected data can be reanalyzed for deriving measurements for parameters newly discovered in future or other parameters not measured previously. Collection of high spectral resolution and wide spectral range raw data also enables more robust measurements as data across multiple parameters can be correlated.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provide an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A device for analyzing skin, the device comprising:
one or more illumination sources, wherein each of the one or more illumination sources is configured to provide light within a predetermined range of optical wavelengths, wherein the one or more illumination sources are further configured to irradiate light directly onto skin;
a plurality of monolithically integrated spectrometers, wherein a spectrometer of the plurality of spectrometers includes a plurality of interference filters overlaying a plurality of optical sensors, wherein each optical sensor of the plurality of optical sensors is associated with an interference filter of the plurality of interference filters such that each optical sensor has a sensing range within a predetermined range of optical wavelengths and is configured to capture light emitted from the skin, further wherein the plurality of spectrometers are positioned a predetermined distance from at least one illumination source of the one or more illumination sources; and
a substrate coupled to the one or more illumination sources and the plurality of spectrometers, wherein the substrate is adapted to be wearably coupled to a user's body part and wherein the substrate is configured to enable substantial contact between the substrate and a portion of skin.

2. The device of claim 1, wherein the predetermined distance is based on an expected penetration path from at least one of the one or more illumination sources.

3. The device of claim 1, comprising:
wherein another spectrometer of the plurality of spectrometers is configured to capture light from the one or more illumination sources indicative of a particular spatial optical response.

4. The device of claim 1, wherein the device includes a plurality of illumination sources, wherein each of the plurality of illumination sources is configured to provide light to each of the plurality of spectrometers indicative of a different spatial optical response.

5. The device of claim 1, wherein a first one of the one or more illumination sources is based on a first predetermined range of optical wavelengths and a second one of the one or more illumination sources is based on a second predetermined range of optical wavelengths, wherein the first and second predetermined range of optical wavelengths are different.

6. The device of claim 5, wherein the first predetermined range of optical wavelengths is less than the second predetermined range of optical wavelengths.

7. The device of claim 5, wherein the first predetermined range of optical wavelengths and the second predetermined range of optical wavelengths do not overlap.

8. The device of claim 1, wherein the one or more illumination sources and the plurality of spectrometers are mounted on an electronic substrate, wherein the electronic substrate comprises at least one of a rigid circuit board, a flexible circuit board, a ribbon cable and a rigid flexible circuit board.

9. The device of claim 1, wherein at least a portion of the one or more illumination sources and the spectrometer protrude from a surface of the device.

10. The device of claim 1, further comprising at least one of:
a user interface;
a communication module;
a control unit;
a memory;
a battery; and
a processor.

11. A method for measuring spectrophotometric parameters of skin, the method comprising:
irradiating a patch of skin with light, by a spectroscopy device, wherein the light is provided by one or more illumination sources, wherein each of the one or more illumination sources is configured to provide light within a predetermined range of optical wavelengths, wherein the one or more illumination sources is further configured to irradiate light directly onto skin; and
collecting, by the spectroscopy device, light exiting the skin, wherein the collecting is done by a plurality of monolithically integrated spectrometers, wherein a spectrometer of the plurality of spectrometers includes a plurality of interference filters, each interference filter of the plurality of interference filters overlaying one or more optical sensors of a plurality of optical sensors, wherein each optical sensor of the plurality of optical sensors has a sensing range within a predetermined range of optical wavelengths and is configured to capture light emitted from the skin, further wherein the one or more illumination sources and the plurality of spectrometers are configured on a single substrate, and further wherein each of the one or more spectrometers is positioned a predetermined distance from at least one illumination source of the one or more illumination sources and wherein the substrate is adapted to be wearably coupled to a user's body part and wherein the substrate is configured to enable substantial contact between the substrate and a portion of skin.

12. The method of claim 11, wherein the predetermined distance is based on an expected penetration path from at least one of the one or more illumination sources.

13. The method of claim 11, wherein the spectroscopy device includes another spectrometer, wherein the another spectrometer is configured to capture light from the one or more illumination sources indicative of a particular spatial optical response.

14. The method of claim 13, wherein the spectroscopy device includes a plurality of illumination sources, wherein each of the plurality of illumination sources is configured to provide light to each of the plurality of spectrometers indicative of a different spatial optical response.

15. The method of claim 11, wherein a first one of the one or more illumination sources is based on a first predetermined range of optical wavelengths and a second one of the one or more illumination sources is based on a second predetermined range of optical wavelengths, wherein the first and second predetermined range of optical wavelengths are different.

16. The method of claim 15, wherein the first predetermined range of optical wavelengths is less than the second predetermined range of optical wavelengths.

17. The method of claim 15, wherein the first predetermined range of optical wavelengths and the second predetermined range of optical wavelengths are selected based on predetermined absorption characteristics of a particular physiological parameter of the skin.

18. The method of claim 11, wherein the one or more illumination sources and the plurality of spectrometers are mounted on an electronic substrate, wherein the electronic substrate comprises at least one of a rigid circuit board, a flexible circuit board, a ribbon cable and a rigid flexible circuit board.

19. The method of claim 11, wherein at least a portion of the one or more illumination sources and the plurality of spectrometers protrude from a surface of the device.

20. The method of claim 15, wherein the second predetermined range of optical wavelengths is less than the first predetermined range of optical wavelengths.

* * * * *